United States Patent
Hatoh et al.

(10) Patent No.: US 8,012,646 B2
(45) Date of Patent: Sep. 6, 2011

(54) POLYMER ELECTROLYTE FUEL CELL PROVIDED WITH A TIGHTENING PRESSURE

(75) Inventors: Kazuhito Hatoh, Osaka (JP); Hiroki Kusakabe, Osaka (JP); Hideo Ohara, Osaka (JP); Susumu Kobayashi, Nara (JP); Nobuhiro Hase, Osaka (JP); Shinsuke Takeguchi, Osaka (JP); Teruhisa Kanbara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/379,239

(22) Filed: Apr. 19, 2006

(65) Prior Publication Data
US 2006/0251944 A1    Nov. 9, 2006

Related U.S. Application Data

(62) Division of application No. 10/397,811, filed on Mar. 25, 2003, now abandoned.

(30) Foreign Application Priority Data

Mar. 26, 2002 (JP) ................................ 2002-085277

(51) Int. Cl.
  *H01M 2/38* (2006.01)
  *H01M 2/40* (2006.01)
  *H01M 8/24* (2006.01)
  *H01M 2/08* (2006.01)
  *H01M 2/14* (2006.01)

(52) U.S. Cl. ........ 429/460; 429/511; 429/456; 429/457; 429/458

(58) Field of Classification Search .................. 429/460, 429/511, 456, 457, 458
See application file for complete search history.

(56) References Cited

U.S. PATENT DOCUMENTS 4,743,518 A * 5/1988 Romanowski ................ 429/458
4,823,086 A   4/1989 Whitmire et al.
(Continued)

FOREIGN PATENT DOCUMENTS
DE    19523260 A1    3/1997
(Continued)

OTHER PUBLICATIONS

David Linden (ed.), Handbook of Batteries, 1995, McGraw-Hill, Inc., see section 1.2.4.*

*Primary Examiner* — Patrick Ryan
*Assistant Examiner* — Julian Anthony
(74) *Attorney, Agent, or Firm* — Panitch Schwarze Belisario & Nadel LLP

(57) ABSTRACT

The durability of a polymer electrolyte fuel cell is very significantly improved by using a tightening pressure of about 2 to 4 $kgf/cm^2$ of area of electrode; or a tightening pressure of about 4 to 8 $kgf/cm^2$ of contact area between electrode and separator plate; or by selecting a value not exceeding about 1.5 $mS/cm^2$ for the short-circuit conductivity attributed to the DC resistance component in each unit cell; or by selecting a value not exceeding about 3 $mA/cm^2$ for the hydrogen leak current per area of electrode of each MEA. Further, in a method of manufacturing or an inspection method for a polymer electrolyte fuel cell stack, fuel cells having high durability can be efficiently manufactured by removing such MEAs or unit cells using such MEAs or such cell stacks having short-circuit conductivity values and/or hydrogen leak current values exceeding predetermined values, respectively.

16 Claims, 11 Drawing Sheets

U.S. PATENT DOCUMENTS

| | | | |
|---|---|---|---|
| 5,514,487 A * | 5/1996 | Washington et al. | 429/460 |
| 5,709,961 A | 1/1998 | Cisar et al. | |
| 5,783,325 A | 7/1998 | Cabasso et al. | |
| 6,007,933 A | 12/1999 | Jones | |
| 6,156,447 A | 12/2000 | Bette et al. | |
| 6,218,039 B1 | 4/2001 | Mease et al. | |
| 6,270,917 B1 * | 8/2001 | Maeda et al. | 429/37 |
| 6,329,093 B1 * | 12/2001 | Ohara et al. | 429/32 |
| 6,348,280 B1 | 2/2002 | Maeda et al. | |
| 2002/0051899 A1 | 5/2002 | Keskula et al. | |

FOREIGN PATENT DOCUMENTS

| | | |
|---|---|---|
| DE | 19649436 C1 | 1/1998 |
| EP | 1069636 A2 | 1/2001 |
| EP | 1255315 A1 | 11/2002 |
| JP | 06044985 A2 | 2/1994 |
| JP | 08-022837 A | 1/1996 |
| JP | 10-012262 A | 1/1998 |
| JP | 11-329465 A | 11/1999 |
| JP | 2000-195529 A | 7/2000 |
| JP | 2000-285945 A | 10/2000 |
| JP | 2000-315507 A | 11/2000 |
| JP | 2002-203578 A | 7/2002 |
| JP | 2002-246044 A | 8/2002 |
| WO | 0159864 A1 | 8/2001 |

* cited by examiner

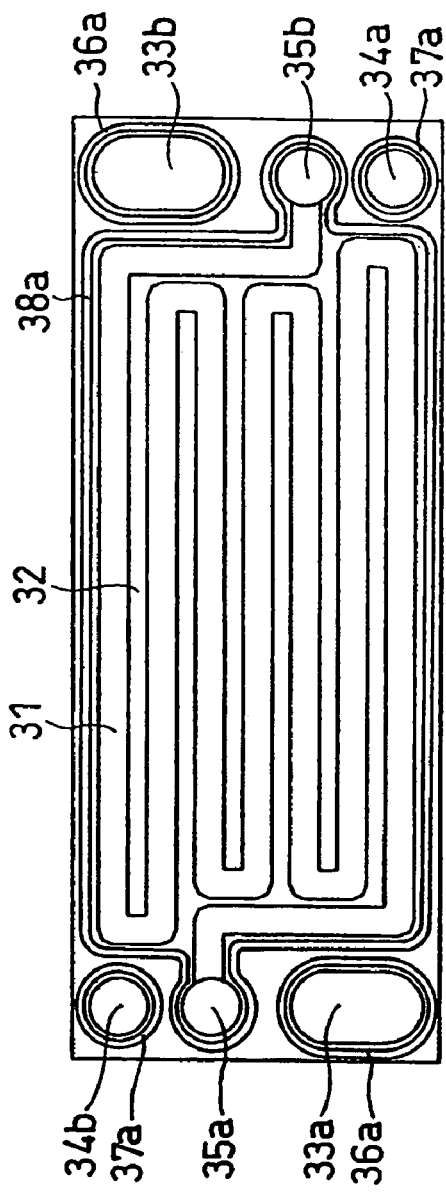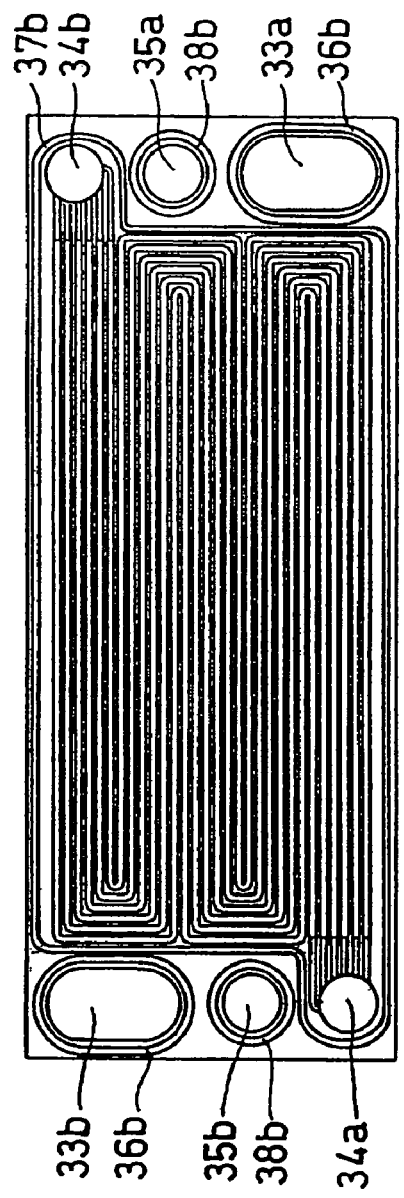
FIG. 3A
FIG. 3B

POLYMER ELECTROLYTE FUEL CELL PROVIDED WITH A TIGHTENING PRESSURE

CROSS-REFERENCE TO RELATED APPLICATIONS

This application is a divisional of U.S. patent application Ser. No. 10/397,811, filed Mar. 25, 2003, and the disclosure of which is incorporated herein by reference.

BACKGROUND OF THE INVENTION

The present invention relates to a polymer electrolyte fuel cell to be used for a portable power source, an electric vehicle, a cogeneration system, or the like, and also relates to a method of manufacturing the same and inspection method therefor.

In a hydrogen ion conductive polymer electrolyte fuel cell, a fuel gas containing hydrogen electrochemically reacts with an oxidant gas containing oxygen, thereby generating electric power and thermal energy simultaneously. To construct such fuel cell, a catalyst layer having, as a main ingredient, a carbon powder carrying a platinum group metal catalyst and having a catalyst function is formed on both major surfaces of a hydrogen ion conductive polymer membrane, which selectively transports hydrogen ions. Next, a porous supporting body which is made, e.g., of a carbon cloth, a carbon non-woven fabric, or a carbon paper, and which has both fuel gas permeability and electronic conductivity is provided as a gas diffusion layer on the outside surface of each catalyst layer. The combination of the gas diffusion layer and the catalyst layer constitutes an electrode. The electrode for the fuel gas is called the anode, while the electrode for the oxidant gas is called the oxidant electrode or cathode.

Next, in order to prevent the supplied fuel gas from leaking outside and from mixing with the oxidant gas, gas sealing members or gaskets, which sandwich the polymer electrolyte membrane therebetween, are placed around the electrodes. The sealing members or gaskets are preliminarily assembled integrally with the electrodes and the polymer electrolyte membrane. The combination of the electrodes and the polymer electrolyte membrane sandwiched between the electrodes is called the electrolyte membrane-electrode assembly (MEA).

A hot pressing process at about 100 to 150° C. is usually used for bonding the catalyst layer and the gas diffusion layer, thereby increasing the handleability in MEA assembling and also increasing the intimate contact between the catalyst layer and the gas diffusion layer. The intimate contact increases the gas reactivity and decreases the contact resistance between the layers. Outside the MEA, electrically conductive separator plates are placed for mechanically fixing the MEA and for electrically connecting neighboring MEAs in series. Each separator plate is provided, on each surface thereof for contact with the MEA, with a gas flow channel for supplying a reactive gas to the electrode and for carrying away generated gas and excess gas to outside. The gas flow channels can be provided separately from the separator plates, but generally the separator plates are provided on the surfaces thereof with gas communication grooves as the gas flow channels.

A pair of neighboring electrically conductive separator plates having an MEA sandwiched therebetween constitutes a unit cell. A fuel cell comprises a cell stack having stacked unit cells.

In order to supply a fuel gas to the gas flow channel, it is necessary to furcate a pipe for supplying the fuel gas to pipe branches corresponding to the number of the assembled separator plates, and to prepare a piping jig for directly connecting the pipe branches to the gas flow channels of the respective separator plates. This jig is called a manifold. The type of manifold as described above, in which the supply pipe is directly connected to the gas flow channels, is called an outer manifold. Another type of manifold, which has a simpler structure, is called an inner manifold. The inner manifold is of such a type that separator plates having gas flow channels are provided with apertures or through-holes, and the inlets and outlets of the gas flow channels are connected to the apertures, through which the fuel gases are supplied or exhausted.

A fuel cell generates heat during its operation. Therefore, in order to maintain the fuel cell at an appropriate temperature condition, it is necessary to cool the fuel cell, e.g., by cooling water. In a cell stack of a fuel cell, a cooling unit is provided to be inserted between neighboring separator plates for every 1 to 3 unit cells. An often employed manner is to bond two separator plates, each having a cooling water flow channel on one surface thereof, such that the surfaces thereof each have the cooling water flow channel facing each other, thereby forming a cooling unit.

Such MEAs, separator plates and cooling units are alternately stacked to a stack of about 10 to 200 cells, thereby forming a cell stack. The cell stack is sandwiched by a pair of current collecting plates, insulating plates and end plates in this order, and is then fixed by tightening bolts provided at the end plates to tighten the cell stack. This is a general structure of a stack type polymer electrolyte fuel cell.

In a conventional fuel cell, a cell stack thereof is usually tightened by a tightening pressure of about 10 to 20 $kgf/cm^2$ for the purpose of decreasing the contact resistances among the polymer electrolyte membrane, the electrodes and the separator plates, and for ensuring the properties of gas sealing with the gas sealing members or gaskets. For this reason, the end plates are generally composed of mechanically strong metal plates, and the tightening bolts are combined with springs or washers for applying a sufficient tightening pressure to the cell stack. Further, stainless steel, which has high resistance to corrosion, is usually used as a material for the end plates, because the end plates partially contact humidified gases and cooling water. Further, with respect to the current collecting plates, metal plates having greater electrical conductivity than carbon plates are usually used, and in some cases are subjected to surface treatment for decreasing the contact resistance. Further, since the end plates electrically contact each other through tightening bolts, an insulating plate is inserted between the current collecting plate and the end plate at each end of the cell stack.

On the other hand, the electrically conductive separator plates to be used for such polymer electrolyte fuel cells need to have a high electrical conductivity, high gas tightness against fuel gases, and high resistance to corrosion, i.e., high resistance to acid, during oxidizing and reducing reactions between hydrogen and oxygen. For these reasons, the separator plates are usually made of gas impermeable and dense carbon plates, which are provided with gas flow channels by cutting. Alternatively, the separator plates are often made by hot pressing a mixture of a thermosetting resin and a graphite powder placed in a press mold having a convex pattern corresponding to the gas follow channels.

In place of using such carbon materials, it has also been attempted to use metal plates, such as stainless steel, for the separator plates. Separator plates using metal plates are likely to become corroded or dissolved during long term use, because the separator plates are exposed to an acid atmosphere at a relatively high temperature. The corroded portion of the metal plate increases the electrical resistance, resulting in a decrease of the fuel cell output. Furthermore, when the metal plate becomes dissolved, the dissolved metal ions diffuse into the polymer electrolyte membrane, and are exchanged with ion exchange sites in the polymer electrolyte membrane, so that consequently the ionic conductivity of the polymer electrolyte membrane itself decreases. For avoiding such deterioration, each metal plate is usually subjected to a noble metal plating, thereby forming a noble metal layer having a sufficient thickness on the surface thereof.

BRIEF SUMMARY OF THE INVENTION

The problems to be solved by the present invention will first be described. As described above, the catalyst layer is usually bonded to the gas diffusion layer by hot pressing at about 100 to 150° C. for increasing the handleability in assembling MEAs and the intimate contact therebetween to realize greater reaction and lower contact resistance. The present inventors have found that when such hot pressing is conducted at a greater temperature, e.g., about 130° C., and a high pressure, e.g., of 20 kgf/cm² or above, then micro or minor short-circuits between the electrodes are generated in the case of some materials or of surface roughness of the gas diffusion layers used, or in the case of some strengths or thickness of the polymer electrolyte membrane used. The slighter such micro short-circuits are, the more difficult it is to find the micro short-circuits during ordinary power generation use of the fuel cell.

Unless such short-circuits are major, they hardly affect the initial performance of power generation of the fuel cell, so that it is difficult to find them. If major short-circuits are already present in an MEA at an initial stage, they decrease the initial power generation performance of the fuel cell, because they lower the open circuit voltage, or they cause cross leak phenomena, in which the hydrogen gas and the oxidant gas mix with each other. Accordingly, it is relatively easy to find such major short-circuits.

A finding on which the present invention is based is that initial micro short-circuits, which are difficult to find in ordinary use, affect stability or durability of power generation performance of the fuel cell significantly. If micro short-circuits, are even slightly present or generated in the initial MEA, an excessively large current flows through the short-circuits. Such current generates heat, and the heat causes the polymer electrolyte in the polymer electrolyte membrane and the electrodes to be thermally decomposed and deteriorated. This causes the short-circuits to become larger as time passes, and thus undesirably promotes the cross leak phenomena. A further finding on which the present invention is based is that such a vicious circle significantly affects the stability or durability of the fuel cell.

Conventionally, in assembling a cell stack by stacking plural unit cells, the cell stack is usually tightened with a tightening pressure of about 10 to 20 kgf/cm². An additional finding on which the present invention is based is that such a tightening may generate micro short-circuits, which significantly affect the durability of the fuel cell.

FIG. 6 shows a schematic cross-sectional view of a conceptual or ideal fuel cell. Referring to FIG. 6, a polymer electrolyte membrane 61 is sandwiched at its major surfaces by a pair of electrodes 64, each comprising a catalyst layer 63 and a gas diffusion layer 62, thereby forming an MEA 65. The MEA 65 is sandwiched at its major surfaces by a pair of electrically conductive separator plates 66, thereby forming a unit cell as shown. As apparent from FIG. 6, in the conceptual unit cell, all of the polymer electrolyte membrane 61, catalyst layers 63 and gas diffusion layers 62 have uniform thicknesses. There is no such assumption therein that micro short-circuits may be present or generated between the two electrodes. Furthermore, gas flow channels 67 in the separator plates 66 maintain their initial conceptual cross-sections.

Another finding on which the present invention is based is that, in actual or practical manufactured unit cells, the uniformity of the respective membrane and layers in a unit cell is damaged by pressure application in hot pressing the catalyst layer and the gas diffusion layer, or by tightening pressure to sandwich each MEA between electrically conductive separator plates. This will be described in the following with reference to FIG. 7, which shows a schematic cross-sectional view of a unit cell with the uniformity of each membrane and layer being damaged, thereby causing a micro short-circuit to be present between the two electrodes of MEA in a unit cell. Referring to FIG. 7, gas diffusion layers 72, catalyst layers 73 and a polymer electrolyte membrane 71 are very significantly distorted, with a micro short-circuit 78 being generated. At the same time, a portion 72a of gas diffusion layer 72 protrudes or hangs out into a gas flow channel 77 of an electrically conductive separator plate 76. The thus protruding gas diffusion layer blocks a part of the gas flow channel, impeding a part of the gas flow, thereby deteriorating the fuel cell performance.

It is also a finding, on which the present invention is based, that excessive pressure or heat in the hot pressing and excessive tightening pressure to the cell stack generate not only micro short-circuits and protrusion of the gas diffusion layer into the gas flow channel, but in some cases physical defects in the polymer electrolyte membrane, thereby causing cross leaks between hydrogen at the fuel electrode side and air or oxidant at the oxidant electrode side. It has been considered that physical defects such as holes in the polymer electrolyte membrane simply allow hydrogen and air to cross leak and mix with each other. According to the study of the present inventors, once defects are generated in the polymer electrolyte membrane, hydrogen and air cross-leaking through the defects mix with each other and burn, thereby not only deteriorating fuel cell performance, but also thermally decomposing the polymer electrolyte in the polymer electrolyte membrane and the electrodes with the heat generated by the burning. As time passes, the thermal decomposition further undesirably promotes short-circuits, thereby increasing the cross leaks of the two gases and badly affecting the durability of the fuel cell.

Furthermore, the present inventors have found that the cross leaks, which have conventionally been considered to be generated only by physical defects in the polymer electrolyte membrane, are also generated by hydrogen dissolved in the polymer electrolyte membrane, which hydrogen diffuses toward the oxidant electrode side and reaches the oxidant electrode due to the concentration gradient of the hydrogen. This phenomenon cannot be avoided in principle in the case of a fuel cell using a membrane of, e.g., perfluorocarbon sulfonic acid for the polymer electrolyte membrane. Therefore, this phenomenon needs to be considered separately from the cross leaks attributed to the conventionally considered physical defects of the polymer electrolyte membrane. More specifically, an inspection method is needed such that the factor of cross leaks caused by dissolution and diffusion of hydrogen, which cannot in principle be avoided, is eliminated in inspecting the quality of the fuel cell. Conventionally, it has been very difficult to inspect only the cross leaks attributed to physically generated defects in the polymer electrolyte membrane.

It is an object of the present invention to provide a polymer electrolyte fuel cell that is capable of high performance, long-term power generation.

It is another object of the present invention to provide a polymer electrolyte fuel cell, wherein micro short-circuits and/or hydrogen leak currents between the electrodes in the MEA, which have been found by the present inventors as being factors which impair stable and long-term power generation, are suppressed.

It is still another object of the present invention to provide a polymer electrolyte fuel cell, wherein each gas diffusion layer is prevented from protruding into the gas flow channel of its respectively adjacent electrically conductive separator plate in the unit cell, thereby maintaining good gas flow in the gas flow channel.

It is yet another object of the present invention to provide a method of manufacturing and a method for inspection of a polymer electrolyte fuel cell, wherein an improved inspection mode for inspecting MEAs is introduced, thereby making it possible to efficiently manufacture fuel cells capable of high performance, stable, long-term power generation.

For achieving one or more of the objects of the present invention, a polymer electrolyte fuel cell according to one aspect of the present invention comprises a cell stack structure having plural unit cells tightened in the stacking direction, each of the unit cells comprising: an MEA comprising a hydrogen ion conductive polymer electrolyte membrane and a pair of electrodes respectively placed on opposite major surfaces of the electrolyte membrane, each of the electrodes comprising a gas diffusion layer and a catalyst layer; an electrically conductive separator plate contacting one of the electrodes and having a gas flow channel for supplying and exhausting a fuel gas to and from the one electrode; and a further electrically conductive separator plate contacting the other electrode and having a gas flow channel for supplying and exhausting an oxidant gas to and from the other electrode, wherein each of the electrodes is provided with a tightening pressure of about 2 to 4 kgf/cm$^2$ of the area of each of the electrodes.

According to another aspect of the present invention, in a similar polymer electrolyte fuel cell structure, the tightening pressure is such that each of the electrodes is provided with a tightening pressure of about 4 to 8 kgf/cm$^2$ of the area of each electrode which contacts its respective electrically conductive separator plate, namely of the contact area between the electrode and the separator plate.

It is preferred that each of the gas flow channels of each of the electrically conductive separator plates have a groove width of about 0.8 mm to 1 mm, and a groove depth of about 0.3 to 1 mm.

Further, it is preferred that the area of each electrode which contacts its respective electrically conductive separator plate be equal to or greater than the area of the electrode which is out of contact with the electrically conductive separator plates.

According to still another aspect of the present invention, in a similar polymer electrolyte fuel cell structure, the MEA has a short-circuit conductivity of not greater than about 1.5 mS/cm$^2$.

According to yet another aspect of the present invention, in a similar polymer electrolyte fuel cell structure, each unit cell comprising an MEA has a hydrogen leak current of not greater than about 3 mA/cm$^2$.

According to a further aspect of the present invention, a method of manufacturing a polymer electrolyte fuel cell according to the present invention comprises processes of: forming plural unit cells; stacking the plural unit cells to form a cell stack; and tightening the cell stack in the stacking direction; wherein the process of forming each of the plural unit cells comprises the steps of: placing a pair of electrodes, one on each major surface of a hydrogen ion conductive polymer electrolyte membrane, each electrode comprising a gas diffusion layer and a catalyst layer, thereby forming an MEA; placing an electrically conductive separator plate contacting one of the electrodes and having a gas flow channel for supplying and exhausting a fuel gas to and from the one electrode; and placing a further electrically conductive separator plate contacting the other electrode and having a gas flow channel for supplying and exhausting an oxidant gas to and from the other electrode; wherein the method further comprises an inspection process comprising the steps of: measuring the short-circuit conductivity of each of the MEAs and/or measuring the hydrogen leak current of each of the unit cells; and removing such MEAs or unit cells or cell stacks that have short-circuit conductivities exceeding a predetermined short-circuit conductivity value or have hydrogen leak currents exceeding a predetermined hydrogen leak current value.

It is preferred that the predetermined value of the short-circuit conductivity be about 1.5 mS/cm$^2$ and that the predetermined value of the hydrogen leak current be about 3 mA/cm$^2$.

It is further preferred that the short-circuit conductivity of each of the MEAs be measured by: applying thereto a constant DC voltage to obtain a steady-state current, or applying a constant DC current to obtain a steady-state voltage; and converting the steady-state current or the steady-state voltage, by calculation, to obtain the short-circuit conductivity.

It is still further preferred that the constant DC voltage not be greater than about 0.5 V for each of the MEAs.

It is also preferred that the constant DC current not be greater than about 5 mA/cm$^2$ of area of electrode of each of the MEAs.

It is further preferred that the step of measuring the short-circuit conductivity of each of the electrolyte membrane-electrode assemblies be conducted by placing the pair of electrodes in a same atmosphere of air or inert gas.

It is still further preferred that the step of measuring the hydrogen leak current of each unit cells be conducted by: supplying an inert gas to one of the electrodes and a fuel gas to the other electrode; applying to each of the MEAs a constant DC voltage to obtain a steady-state current, or applying thereto a constant DC current to obtain a steady-state voltage; and calculating a difference value by subtracting a value corresponding to the short-circuit conductivity from a value calculated from the steady-state current or the steady-state voltage.

It is also preferred that the inspection process comprise, before the process of forming the cell stack, the steps of: measuring the short-circuit conductivity of each MEA and/or the hydrogen leak current of each unit cell; and removing such MEAs or unit cells that have short-circuit conductivities exceeding the predetermined short-circuit conductivity value or have hydrogen leak currents exceeding the predetermined hydrogen leak current value.

Alternatively, it is preferred that the inspection process comprise, after the process of forming the cell stack, the steps of: measuring the short-circuit conductivity of each MEA and/or the hydrogen leak current of each unit cell; and removing such MEAs or unit cells or cell stacks that have short-circuit conductivities exceeding the predetermined short-circuit conductivity value or have hydrogen leak currents exceeding the predetermined hydrogen leak current value.

According to another aspect of the present invention, in a method similar to that described above, with or without the inspection process, the process of forming the plural unit cells further comprises, before the step of forming each MEA, a step of smoothing both surfaces of each gas diffusion layers.

According to yet a further aspect of the present invention, an inspection method for a polymer electrolyte fuel cell according to the present invention comprises, before operation of electric power generation of the polymer electrolyte fuel cell, and before or after the process of forming the cell stack, the steps of: measuring the short-circuit conductivity of each MEA and/or the hydrogen leak current of each unit cell; and inspecting to see whether the short-circuit conductivity exceeds a predetermined short-circuit conductivity value, and/or whether the hydrogen leak current exceeds a predetermined hydrogen leak current value.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3A is a schematic plan view of still another electrically conductive separator plate used in Examples of the present invention described below, showing a front surface thereof.

FIG. 3B is a schematic plan view of the same separator plate of FIG. 3A, showing a rear surface thereof.

DETAILED DESCRIPTION OF THE INVENTION

Figure 1A:
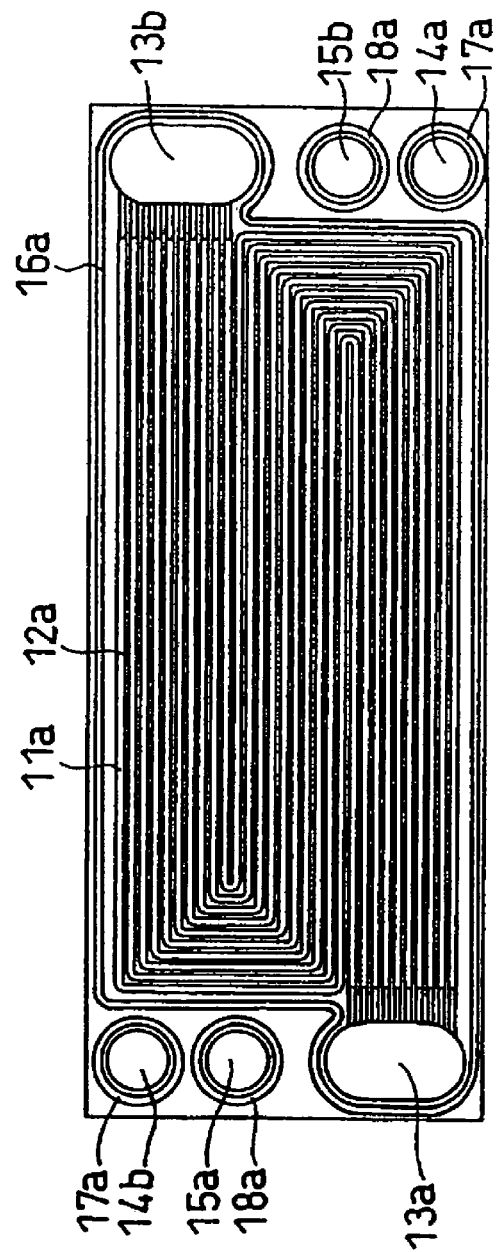
FIG. 1A is a schematic plan view of an electrically conductive separator plate used in Examples of the present invention described below, showing a front surface thereof.

A feature of a polymer electrolyte fuel cell according to the present invention is that, with respect to the pressure for tightening stacked unit cells or a cell stack, the tightening pressure per area of each electrode is about 2 to 4 $kgf/cm^2$. When the tightening pressure per area of electrode is less than about 2 $kgf/cm^2$, the contact resistances among the polymer electrolyte membrane, the electrodes and the electrically conductive separator plates become high, so that sufficient cell performance cannot be obtained. On the other hand, when the tightening pressure per area of electrode is greater than about 4 $kgf/cm^2$, micro short-circuits have been found to be generated in the case of (or depending on) some kinds of materials, surface roughness of the gas diffusion layers, and some strengths and thicknesses of the polymer electrolyte membrane.

Particularly, generation of micro short-circuits is significantly affected by kinds of surface roughness of the gas diffusion layer. Woven fabrics such as a carbon cloth, inter alia, are likely to have variations of thickness on the surface of the gas diffusion layer due to superposition of carbon fibers, so that they are very significantly affected by tightening pressure. Thus, a smoothing treatment, namely a treatment of preliminarily reducing roughness and thickness variations of the surface of the gas diffusion layer, has been found to be effective for reducing the influence of the tightening pressure. As the surface smoothing treatment, the gas diffusion layer can be subjected, e.g., to preliminary pressing or preliminary flame treatment at the surface thereof.

As the micro short-circuits become smaller, it becomes significantly more difficult to find such micro short-circuits under normal use or power generation. Unless they are major short-circuits, they hardly affect initial power generation performance of the fuel cell. However, if micro short-circuits are present, even slightly, in the initial MEA, excessive electric current flows through such micro short-circuits, thereby generating heat. The generated heat thermally decomposes the polymer electrolyte in the polymer electrolyte membrane and the electrodes, whereby the electrolyte deteriorates. This causes the short-circuits to become bigger as time passes. Consequently, cross leak increases, thereby significantly deteriorating the durability of resultant fuel cells. This is a finding on which the present invention is based.

According to another aspect, a feature of a polymer electrolyte fuel cell according to the present invention is that, with respect to the pressure for tightening stacked unit cells, the tightening pressure per contact area between each electrode and each electrically conductive separator plate is about 4 to 8 $kgf/cm^2$. More specifically, each electrically conductive separator plate has a gas communication groove or a gas flow channel, which does not contact the electrode, and also has a rib portion which contacts the electrode. The tightening pressure is actually applied or transferred to the electrodes via the rib portions of the separator plates.

When a rigid material, such as carbon paper, is used for the gas diffusion layer, the tightening pressure is transferred to substantially the entire area of the polymer electrolyte membrane via the contact area between the separator plate and the electrode.

However, when a relatively soft material, such as carbon cloth, is used for the gas diffusion layer, the tightening pressure is basically transferred locally to portions of the polymer electrolyte membrane corresponding to the electrode and via the contact portions between the separator plate and the electrode, and is not transferred evenly to the entire area of the polymer electrolyte membrane. Accordingly, actual pressure applied to portions of the polymer electrolyte membrane, which portions correspond to the contact portions between the separator plate and the electrode, is varied depending on the area ratio between (1) the area corresponding to the contact portions where the separator plate contacts the electrode, and (2) the area corresponding to the non-contact portions where the separator plate is out of contact with the electrode.

Let us assume, for example, that the area of the electrode contacting the separator plate is 20%, that the area of the electrode out of contact with the separator plate is 80%, and that a tightening pressure of 3 kgf/cm$^2$ of area of the electrode, namely per total area of the electrode, is applied. Under this assumption, the actual tightening pressure applied to portions of the electrode in contact with the separator plate is 15 kgf/cm$^2$. Accordingly, it has been found that when a soft material is used for the gas diffusion layer, the tightening pressure is preferably determined per contact area between the electrode and the separator plate, rather than per area of the electrode.

A feature according to a further aspect of the present invention is that each MEA has a short-circuit conductivity of not greater than about 1.5 mS/cm$^2$. This short-circuit conductivity can be more specifically expressed by short-circuit conductivity attributed to the DC resistance component between the fuel electrode and the oxidant electrode of the unit cell. It has been found that even though micro short-circuits are present in an MEA, or are generated in the MEA by hot pressing the MEA or by tightening the cell stack, such micro short-circuits hardly affect the resultant durability of the fuel cell, if the short-circuit conductivity of the MEA is not greater than about 1.5 mS/cm$^2$, more preferably not greater than about 1 mS/cm$^2$.

The short-circuit conductivity of the MEA is preferably measured by: applying thereto a constant DC voltage to obtain a steady-state current, or applying a constant DC current to obtain a steady-state voltage; and converting the steady-state current or the steady-state voltage, by calculation, to the short-circuit conductivity. Here, the steady-state current and the steady-state voltage are explained in the following. As will be described later with reference to FIG. 13 and FIG. 14, when a constant DC voltage or a constant DC current is applied across the electrodes of the MEA, the current or the voltage between the two electrodes abruptly varies during an initial time period after the application of such DC voltage or DC current. However, at some point, e.g., 1 to 3 minutes after the application of such DC voltage or DC current, the current or the voltage becomes stable, and the variation thereof with time becomes almost non-existent. Such current and voltage, which have become stable and have almost no variation with time, are referred to in the present specification as steady-state current and steady-state voltage, respectively.

These steady-state current and steady-state voltage are attributable to a DC resistance component alone of the MEA or between the two electrodes of the unit cell. Dividing the applied DC voltage by the measured steady-state current, or dividing the measured steady-state voltage by the applied DC current, the resistance of the MEA is obtained. The inverse or reciprocal value of such resistance per unit area of the electrode can thus be calculated and is the short-circuit conductivity of the MEA.

Here, the following points should be noted. Immediately after the application of the DC voltage or the DC current, a very large current or high voltage is generated, which may cause the polymer electrolyte and the catalysts in the electrodes to decompose. In order to avoid such decomposition of materials by large current or high voltage, it is preferred that the constant DC voltage applied not be greater than about 0.5 V, more preferably about 0.2 V, per MEA or unit cell, and that the constant DC current applied not be greater than about 5 mA/cm$^2$, more preferably about 2 mA/cm$^2$, of area of each electrode.

Furthermore, in order to measure the short-circuit conductivity attributed to DC resistance alone, the MEA must be prevented from generating an electrochemical reaction. For avoiding electrochemical reaction in the measurement, there should be no difference in partial pressure of hydrogen gas and oxygen gas between the two electrodes of the MEA. For this reason, it is preferred that both electrodes of the MEA be placed in the same atmosphere. As such atmosphere, inert gas such as nitrogen is preferable. For handy measurement, however, such atmosphere can be air. For example, DC voltage or DC current can be applied to the MEA, which is exposed to air and sandwiched by separator plates capable of collecting current. To avoid the electrochemical reaction, it is also preferred that neither the MEA nor the gas supplied to the MEA contain water, because when a polymer electrolyte does not contain water, the ionic conductivity of the electrolyte is low, so that electrochemical reaction barely occurs.

According to a further aspect of the present invention, a feature of the polymer electrolyte fuel cell is that each unit cell comprising an MEA has a hydrogen leak current of not greater than about 3 mA/cm$^2$, preferably not greater than about 2 mA/cm$^2$. It has been found that when such hydrogen leak current is not greater than about 3 mA/cm$^2$, the durability or stable long-term operation of the resultant fuel cell is hardly affected by the hydrogen leak current. Further, the hydrogen leak current value caused by dissolution of hydrogen gas alone into the polymer electrolyte membrane having no physical defects has been found to be about 1 to 2 mA/cm$^2$. It has thus been found that when the value is not greater than about 2 mA/cm$^2$, the influence of the hydrogen leak current further decreases.

It is preferred that the hydrogen leak current of each unit cell be measured by: supplying an inert gas to one of the electrodes of the MEA and a fuel gas to the other electrode; applying to each of the electrolyte membrane-electrode assemblies a constant DC voltage to obtain a steady-state current, or applying thereto a constant DC current to obtain a steady-state voltage; and converting, by calculation, a difference value obtained by subtracting a value corresponding to the short-circuit conductivity from a value calculated from the steady-state current or the steady-state voltage, to yield the hydrogen leak current. By supplying an insert gas to one of the electrodes of the MEA and a fuel gas to the other electrode, and applying a constant DC voltage or a constant DC current, a steady-state current or a steady-state voltage is obtained. The total conductivity calculated from the steady-state current or the steady-state voltage includes both the conductivity attributed to micro short-circuits and the hydrogen leak current value, more precisely the conductivity corresponding to the hydrogen leak current value. Thus, by subtracting the conductivity attributed to the micro short-circuits from the total conductivity, a conductivity difference is obtained. Re-converting, by calculation, the conductivity difference to a current value per area of electrode of unit cell, the hydrogen leak current can be obtained.

Next, regarding the configuration of the electrically conductive separator plates, it is preferred that each gas flow channel of each separator plate have a groove width of about 0.8 mm to 1 mm, and a groove depth of about 0.3 to 1 mm. When the groove width is greater than about 1 mm, particularly in the case of soft gas diffusion layers, e.g., of carbon cloth, the gas diffusion layer is likely to hang out or protrude into each groove or gas follow channel. On the other hand, when the groove width is smaller than about 0.8 mm, the resultant amount of gas flow in each groove or gas flow channel may become undesirably insufficient. When the groove depth is smaller than about 0.3 mm, it becomes likely that the gas diffusion layer hanging out or protruding into the groove may block too much gas flow, thereby decreasing the resultant fuel cell performance. On the other hand, when the groove depth is greater than about 1 mm, each separator plate is likely to become too weak. In order to increase the strength of each separator plate having such large groove depth, it becomes necessary to make each separator plate overly thick. According to the present specification, the term "groove width" is used to mean average width of groove. When the wall of the groove is vertical to the surface of the separator plate, namely not tapered, the groove width is constant from the top surface of the groove to the bottom surface of the groove. So, when the groove width is described as being, e.g., 1.0 mm, it is 1.0 mm wide from the top to the bottom of the groove. However, when the groove wall is tapered, such that the top of the groove is wider than the bottom of the groove, the groove having a groove width of 1.0 mm according to the present specification can have a top width greater than 1.0 mm (e.g., 1.1 mm) and a bottom width less than 1.0 mm (e.g., 0.9 mm) as long as the average groove width is 1.0 mm.

Regarding contact area between each electrically conductive separator plate and each electrode, it is preferred that the area of each electrode which contacts each separator plates be equal to or greater than the area of each electrode which is out of contact with each separator plate. This non-contact or contact between the electrode and the separator plate is primarily attributed to the separator surface having the groove portions or gas flow channel portions and to rib portions, respectively. When the contact area relation as described above is satisfied, particularly in the case of soft gas diffusion layers, e.g., of carbon cloth, it becomes easier to prevent each gas diffusion layer from hanging out or protruding into each gas follow channel, and to evenly sandwich the entire area of each electrolyte membrane by each pair of electrodes. Furthermore, under such contact area relation between each electrode and each separator plate, it becomes possible to use separator plates having a relatively low electric conductivity or high resistance without significantly affecting the resultant fuel cell performance due to the relatively low conductivity or high resistance of the separator plate.

According to a still further aspect of the present invention which relates to a method of manufacturing a polymer electrolyte fuel cell, a feature thereof is that the method comprises an inspection process comprising the steps of: measuring the short-circuit conductivity of each MEA and/or the hydrogen leak current of each unit cell; and removing such MEAs or such unit cells or such cell stacks that have short-circuit conductivities exceeding a predetermined short-circuit conductivity value or have hydrogen leak currents exceeding a predetermined hydrogen leak current value. By introducing such inspection process, fuel cells capable of stably operating for a long time can be manufactured without necessitating actually operating the fuel cells.

Here, for the reasons already set forth above, it is preferred that such predetermined short-circuit conductivity value be about 1.5 mS/cm$^2$ and such predetermined hydrogen leak current value be about 3 mA/cm$^2$. Further, fuel cells can be efficiently manufactured by conducting the inspection process before the process of forming the cell stack, and by removing such MEAs or such unit cells that have short-circuit conductivities exceeding the predetermined short-circuit conductivity value or have hydrogen leak-currents exceeding the predetermined hydrogen leak current value. Further, even if the inspection process is conducted after the process of forming the cell stack, fuel cells can still be efficiently or conveniently manufactured by removing such MEAs or such unit cells or such cell stacks that have short-circuit conductivities exceeding the predetermined short-circuit conductivity value or have hydrogen leak currents exceeding the predetermined hydrogen leak current value. Thus, pre-shipment inspection can then be easily conducted without the need for measurements of fuel cell performance using actual operation of the fuel cells, which has conventionally been needed.

The present invention will now be described with reference to the following specific, non-limiting Examples.

EXAMPLE 1

The present Example 1 will be described with reference to FIGS. 1A, 1B, 2A, 2B, 3A, 3B, 4, 5 and 10.

First of all, a method of making an electrode having a catalyst layer formed thereon will be described. An acetylene black powder carrying 25 wt % of platinum particles having an average particle size of 3 nm was prepared as a catalyst for the electrodes. An ethyl alcohol dispersion of a perfluorocarbon sulfonic acid powder was mixed with a solution of isopropanol having this catalyst powder dispersed therein, thereby forming a catalyst paste.

Meanwhile, plural carbon papers (TGP-H-120: product of Toray Industries, Inc.) each having an outer dimension of 9 cm×20 cm and a thickness of 270 μm, as a porous supporting body for supporting an electrode, were subjected to water repelling treatment as follows. The carbon paper was immersed in an aqueous dispersion containing a fluorocarbon resin (Neoflon™ ND1: product of Daikin Industries, Inc.), dried, and then heated at 380° C. for 30 minutes, thereby giving water repellency to the carbon paper. On one surface of the carbon paper, the above catalyst paste was coated by using screen printing, thereby forming a catalyst layer. Here, a part of the catalyst layer is impregnated in the carbon paper. An electrode was thereby made of a carbon paper with a catalyst layer formed thereon. Here, an adjustment was made so that the thus-made electrode contained 0.3 mg/cm$^2$ of platinum, and 1.2 mg/cm$^2$ of perfluorocarbon sulfonic acid.

Thereafter, a pair of such electrodes was bonded, by hot pressing at a temperature of 130° C. and a pressure of 3 kgf/cm$^2$, on a front surface and a rear surface, respectively, of a proton conductive polymer electrolyte membrane having an outer dimension of 10 cm×26 cm in such a manner that the catalyst layers of the electrodes were brought into contact with the opposite major surfaces of the electrolyte membrane, thereby forming an electrolyte membrane-electrode assembly (MEA). The proton conductive polymer electrolyte membrane used here was made by using a perfluorocarbon sulfonic acid, and was formed to a thin film having a thickness of 50 µm.

Figure 1B:
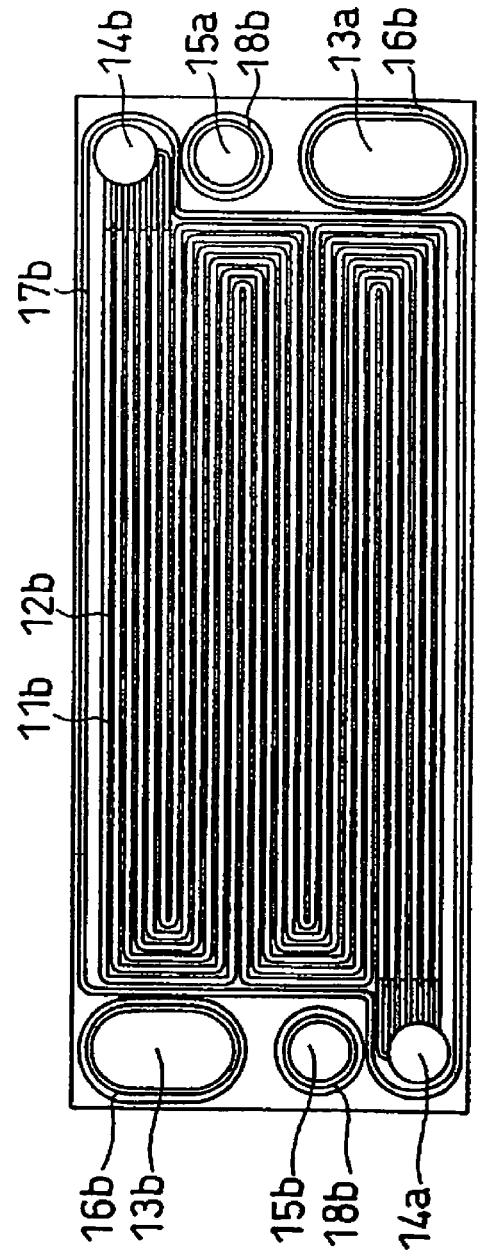
FIG. 1B is a schematic plan view of the same separator plate of FIG. 1A, showing a rear surface thereof.

FIG. 1A and FIG. 1B are schematic plan views showing an electrically conductive separator plate as used in the present Example, showing a front surface and a rear surface thereof, respectively, which have, e.g., grooves for gas communication, namely gas flow channels. This separator plate was made by cutting a dense and gas-impermeable isotropic graphite (glass-like carbon) plate. FIG. 1A shows configurations of oxidant gas communication grooves or flow channels, and FIG. 1B shows configurations of fuel gas communication grooves or flow channels. The separator plate had a dimension of 10 cm×26 cm, and a thickness of 2 mm. Grooves 11a, 11b are each concave portions having a width of 1.0 mm and a depth of 0.7 mm for the reactive gases to communicate therethrough, respectively. On the other hand, rib portions 12a, 12b between the gas flow channels are each convex portions having a width of 1.2 mm, with the surfaces thereof being the surfaces of the separator plate. Further, the separator plate had, formed therein, manifold holes (inlet 13a, outlet 13b) for oxidant gas, manifold holes (inlet 14a, outlet 14b) for fuel gas, and manifold holes (inlet 15a, outlet 15b) for cooling water.

As will be described later, in sandwiching an MEA between two separator plates each as shown in FIGS. 1A and 1B for making a unit cell, the rear surface, FIG. 1B, of one of the separator plates was placed to face the front surface, FIG. 1A, of the other separator plate, with the MEA being sandwiched therebetween. For this reason, as shown from FIGS. 1A and 1B, the respective elements such as gas communication grooves on the opposite surfaces of the separator plate were designed to be correspondingly positioned and have the same shapes and sizes, thereby enabling matching for the sandwiching.

Figure 2A:
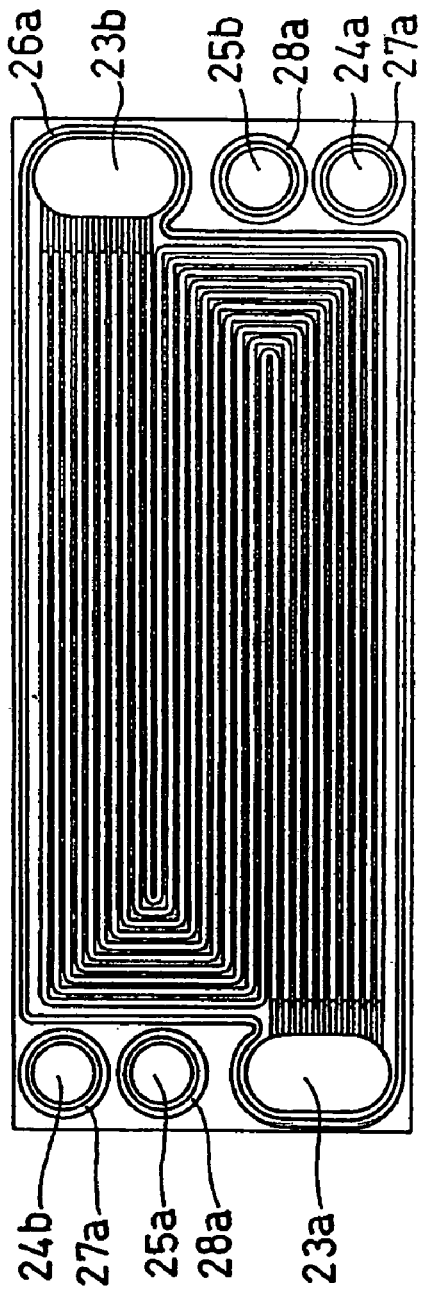
FIG. 2A is a schematic plan view of another electrically conductive separator plate used in Examples of the present invention described below, showing a front surface thereof.
Figure 2B:
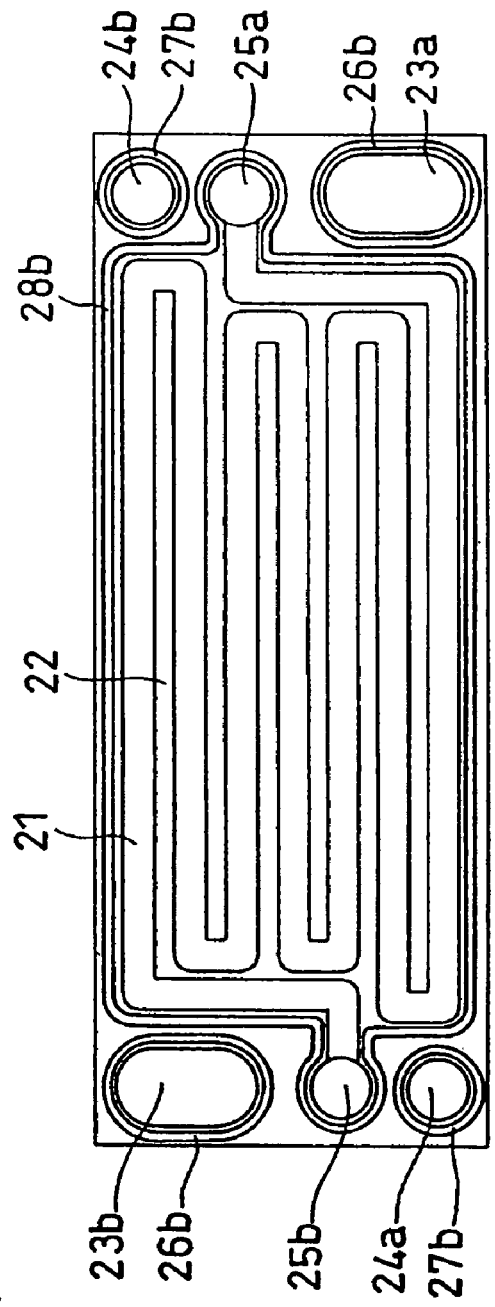
FIG. 2B is a schematic plan view of the same separator plate of FIG. 2A, showing a rear surface thereof.

FIG. 2A and FIG. 2B are schematic plan views showing a further electrically conductive separator plate as used in the present Example, showing a front surface and a rear surface thereof, respectively. FIG. 2A shows configurations of oxidant gas communication grooves or flow channels formed on the front surface of the separator plate as in FIG. 1A, while FIG. 2B shows configurations of cooling water flow channels formed on the rear surface thereof for flowing a cooling water therethrough.

The separator plate as shown in FIGS. 2A and 2B was so designed to have manifold holes (inlet 25a, outlet 25b) for cooling water positioned at locations corresponding to the manifold holes 15a, 15b for cooling water of FIGS. 1A and 1B, respectively. Also, the former manifold holes were so designed to have the same size and shape corresponding those of the latter manifold holes. Likewise, the sizes and shapes as well as the positions of other manifold holes for gas communication (oxidant gas inlet 23a and outlet 23b; fuel gas inlet 24a and outlet 24b) were designed to be the same as and correspond to those of the manifold fold holes for gas communication in the separator plate as shown in FIGS. 1A and 1B.

Reference numeral 21 designates a concave-shaped portion or groove for flowing cooling water from the inlet 25a. The depth of the groove was 0.5 mm. Reference numeral 22 designates convex-shaped portion or rib between the groove sections of the groove 21. The rib is a portion of the separator plate having remained by the cutting machining for the groove 21. The cooling water flows into the groove from the inlet 25a, and reaches the outlet 25b.

As will be described later, in sandwiching an MEA between one separator plate as shown in FIGS. 1A, 1B and a further separator plate as shown in FIGS. 2A, 2B for making a unit cell, the rear surface, FIG. 1B, of the one separator plate was placed to face the front surface, FIG. 2A, of the further separator plate, with the MEA being sandwiched therebetween. This is the reason why, as shown in these drawings, the respective elements such as gas communication grooves on the surface of the one separator plate as shown in FIG. 1B were designed to be correspondingly positioned and have the same shapes and sizes as those of the further separator plate as shown in FIG. 2A, thereby enabling matching for the sandwiching.

FIGS. 3A and 3B are schematic plan views showing a still further electrically conductive separator plate as used in the present Example, showing a front surface and a rear surface thereof, respectively. FIG. 3A shows configurations of a cooling water flow channel, while FIG. 3B shows configurations of a fuel gas flow channel. The size and shape as well as the positions of manifold holes for cooling water communication (inlet 35a, outlet 35b) were designed to be the same as and correspond to those of the manifold holes 15a, 15b for cooling water communication in the separator plate as shown in FIGS. 1A and 1B. Likewise, the sizes and shapes as well as the positions of manifold holes for gas communication (oxidant gas inlet 33a and outlet 33b; fuel gas inlet 34a and outlet 34b) were designed to be the same as and correspond to those of the manifold holes for gas communication in the separator plate as shown in FIGS. 1A and 1B.

Reference numeral 31 designates a concave-shaped portion or groove for flowing cooling water from the inlet 35a. The depth of the groove was 0.5 mm. Reference numeral 32 designates a convex-shaped portion or rib between the groove sections of the groove 31. The rib is a portion of the separator plate remaining from the machining for the groove 31. The cooling water flows into the groove from the inlet 35a, and reaches the outlet 35b.

As will be described later, an electrically conductive separator plate unit having a cooling water unit therein was made by combining one separator plates as shown in FIGS. 2A, 2B and a further separator plate as shown in FIGS. 3A, 3B in a manner that the rear surface, FIG. 2B, of the one separator plate was placed to face and bonded with the front surface, FIG. 3A, of the further separator plate. This is the reason why, as shown in these drawings, the respective elements such as the cooling water grooves and ribs on the surface of the one separator plate as shown in FIG. 2B were designed to be correspondingly positioned and have the same shapes and sizes as those of the further separator plate as shown in FIG. 3A, thereby enabling matching for the face to face bonding:

It is to be noted here that in the case of electrically conductive separator plates to be placed at both ends of a cell stack for contacting current collecting plates, as will be described with reference to FIG. 5, one surface of each such separator plate, which surface is for contact with the current collecting plate, was not provided with any flow channel, but kept planar.

Next, in making each unit cell or separator plate unit having a cooling unit therein by using separator plates as shown in FIG. 1A to FIG. 3B, sealing members for gaskets were used. More specifically, O-ring-like sealing members made of Viton™-GDL (product of DuPont Dow Elastomer Japan) being an elastic body, each sealing member having a circular or ellipse cross-section, were placed on surfaces of separator plates at places close to the peripheries of, and in a manner to encircle, the gas communication grooves, the cooling water channels and the manifold holes. These sealing members are shown in such drawings FIG. 1A to FIG. 3B by reference numerals 16a, 16b, 17a, 17b, 18a, 18b, 26a, 26b, 27a, 27b, 28*a*, 28*b*, 36*a*, 36*b*, 37*a*, 37*b*, 38*a* and 38*b*. As shown in the plan views of these drawings, they have shapes of circles or ellipses for encircling each manifold hole, or shapes of irregular loops for encircling each entire gas flow channel or each entire water cooling channel.

These sealing members were placed at corresponding positions at facing surfaces of each pair of separator plates for forming each unit cell and cooling water unit, so that the thus facing sealing members in each pair of separator plates were either indirectly pressed to each other with a polymer electrolyte membrane therebetween at certain places, or directly pressed to each other at other places. Consequently, such sealing members in combination with surfaces of separator plates supporting the sealing members constituted gaskets having a sealing function.

The term "O-ring-like" in the "C-ring-like" sealing member is used herein to express that the sealing member has a ring or loop shape corresponding to the shape of the portion to be encircled and sealed thereby, and that the sealing member has a cross-section of a circle or an ellipse. Thus, it is preferred that each unit cell comprises at least two laterally spaced-apart sealing members, such that each sealing member encircles a periphery of one of at least two laterally spaced-apart manifold holes in at least one of the separator plates.

Describing more specifically with respect to, e.g., a cooling water unit, a separator plate as shown in FIGS. 2A, 2B was combined with a separator plate as shown in FIGS. 3A, 3B in a manner that the surface as shown in FIG. 2B was placed to face the surface as shown in FIG. 3A, so that the ribs and grooves of one surface face those of the other surface, and also that O-ring -like sealing members on the two facing surfaces face and are pressed to each other. If necessary, an electrically conductive adhesive was used for bonding each O-ring-like sealing member to its supporting surface on each electrically conductive separator plate.

Figure 4:
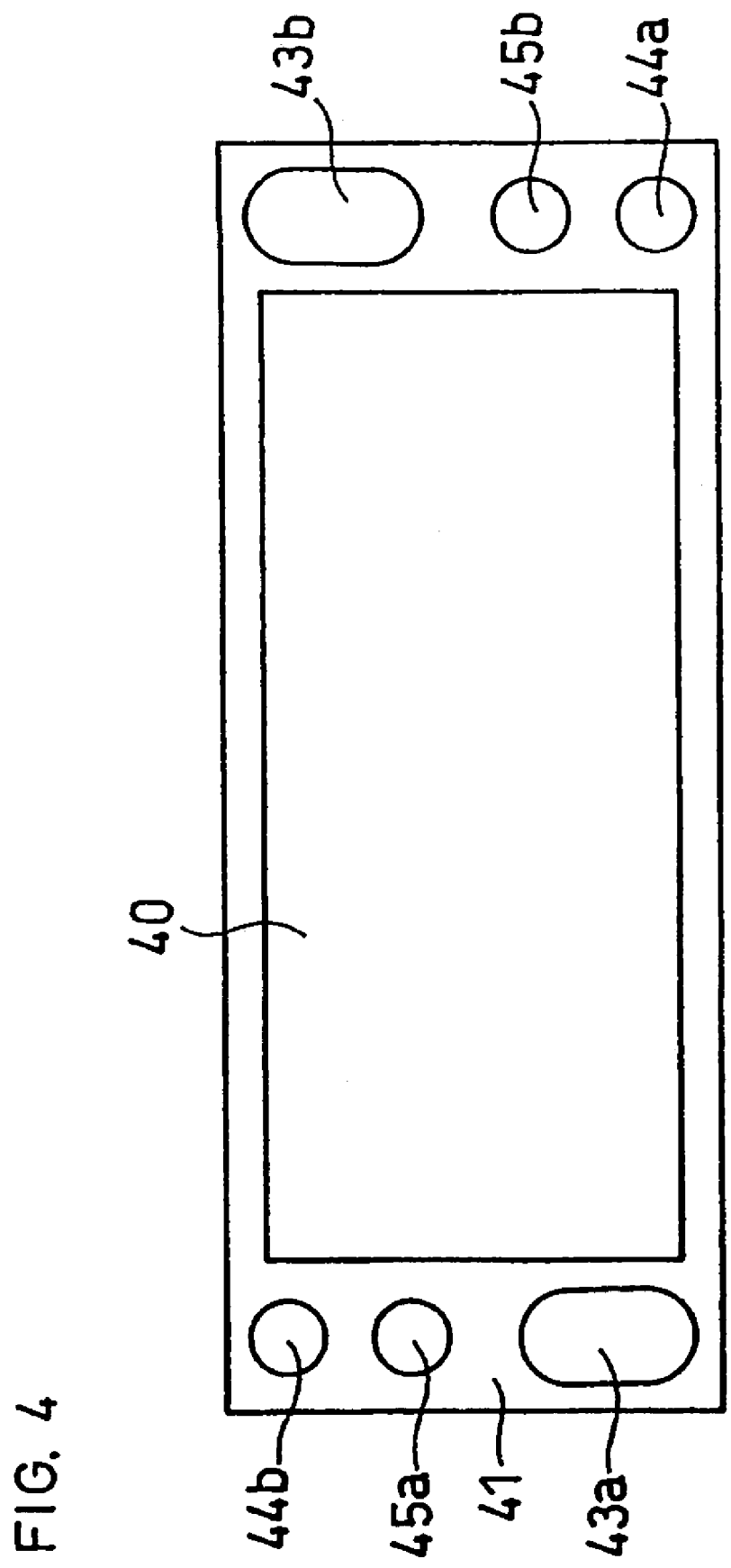
FIG. 4 is a schematic plan view of an MEA used in Examples of the present invention described below, showing a front surface thereof.

Next, each proton conductive polymer electrolyte membrane of each prepared MEA was provided with manifold holes for flowing cooling water, fuel gas and oxidant gas. FIG. 4 shows a front surface of an MEA. Referring to FIG. 4, reference numeral 40 designates an electrode such as a fuel electrode, and reference numeral 41 designates a proton conductive polymer electrolyte membrane. The polymer electrolyte membrane 41 was provided with manifold holes (inlet 43*a* and outlet 43*b*) for oxidant gas, manifold holes (inlet 44*a* and outlet 44*b*) for fuel gas, and manifold holes (inlet 45*a* and outlet 45*b*) for cooling water. The sizes and shapes as well as the positions of these manifold holes were designed to be the same as and correspond to those respective manifold holes in the separator plates as shown in FIG. 1A to FIG. 3B. Although not shown in FIG. 4, the rear surface of the MEA was also provided with an electrode, such as an oxidant electrode, and all six manifold holes pass through to the rear surface as well.

In the present Example 1, a polymer electrolyte fuel cell having a two-cell-stacked cell stack was made. The structure of such fuel cell will be described below with reference to FIG. 5. FIG. 5 is a schematic front view of such fuel cell, wherein the upper part is a schematic cross-sectional view cut by a plane which is parallel to the length of the fuel cell or perpendicular to each separator plate, and which passes through the center of each manifold hole of the fuel gas inlet.

Figure 5:
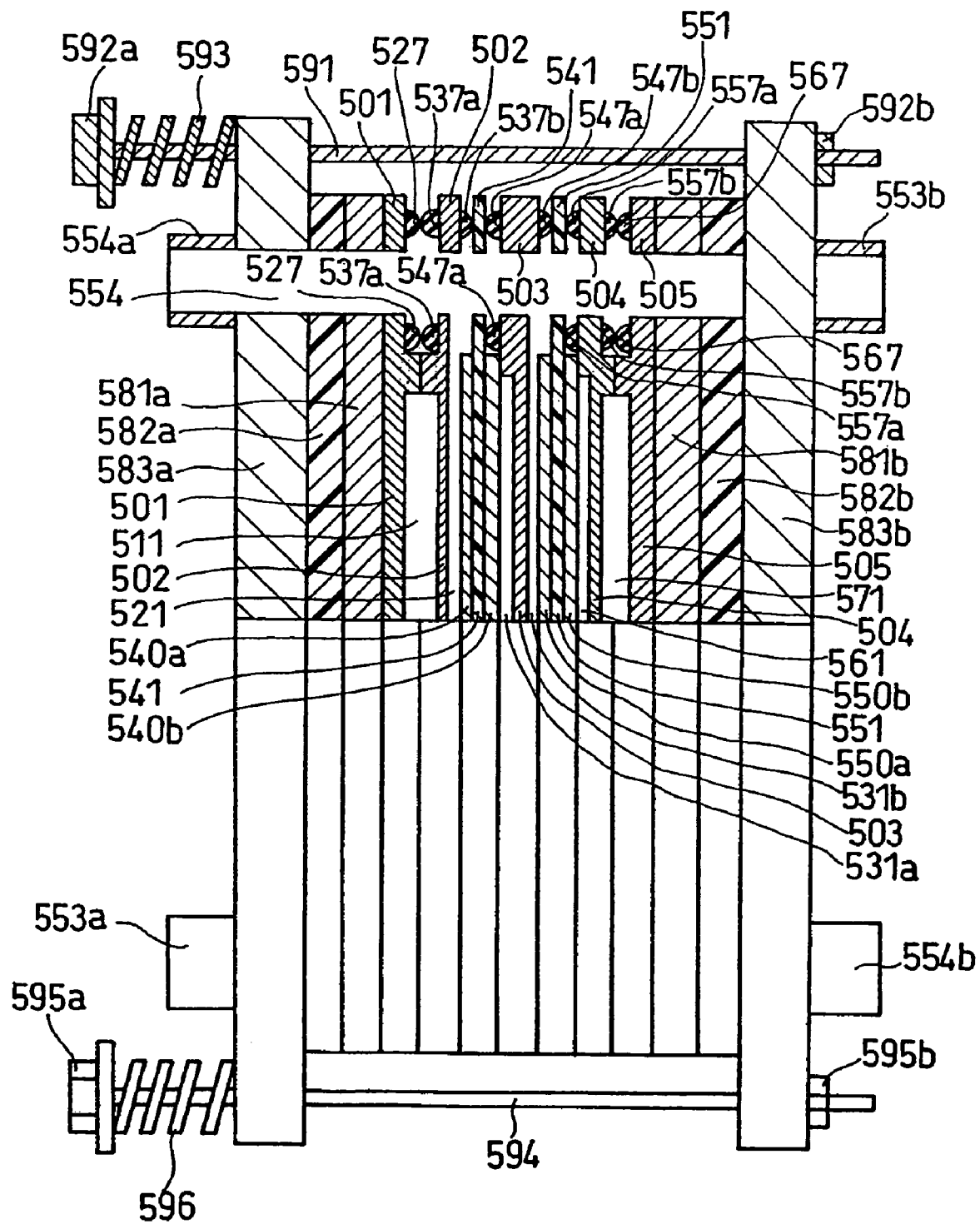
FIG. 5 is a schematic front view, partially in cross-section, of a two-cell stacked fuel cell used in Examples of the present invention described below.
Figure 6:
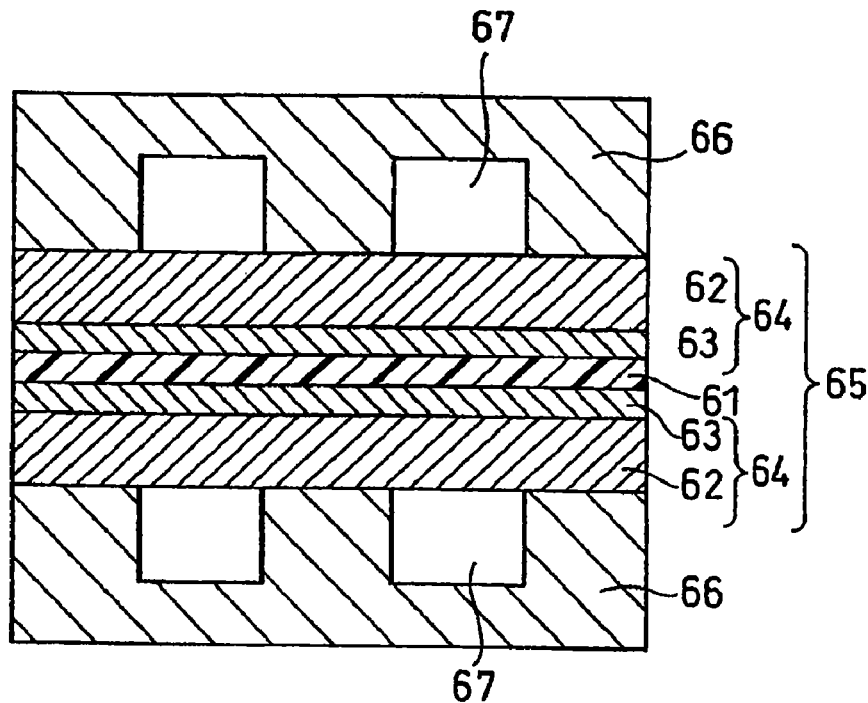
FIG. 6 is a schematic cross-sectional view of a conceptual unit cell.
Figure 7:
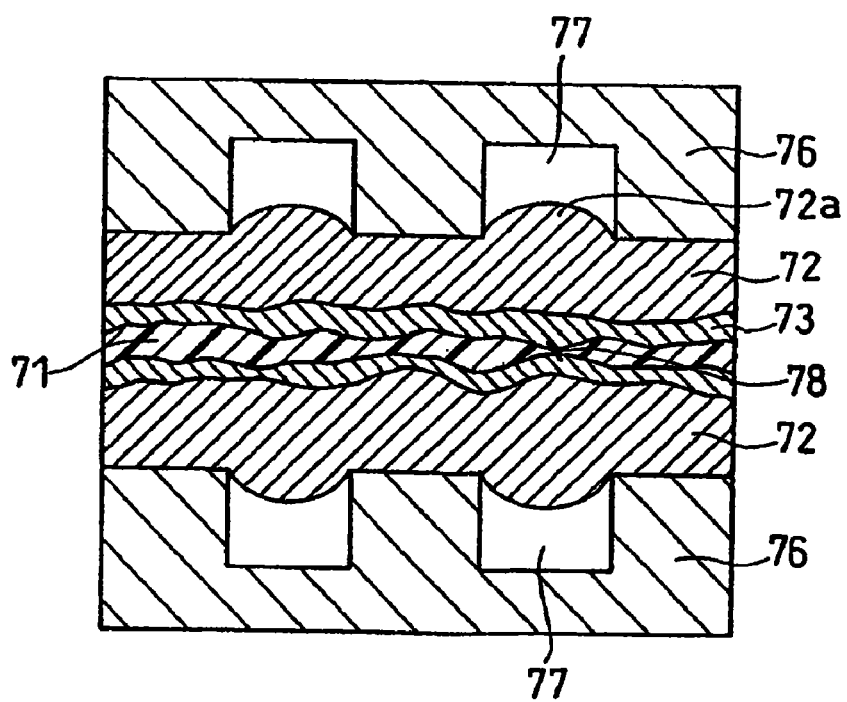
FIG. 7 is a schematic cross-sectional view of a practical unit cell.

Referring to FIG. 5, a combination of a two-cell-stacked cell stack and two cooling units provided at both outer surfaces of the cell stack is sandwiched by two current collecting plates 581*a*, 581*b*. Describing it from the left side starting from the left side cooling unit: First, reference numeral 501 designates an electrically conductive separator plate having a planar surface at a front surface thereof and having, at a rear surface thereof, a surface as shown in FIG. 2B, where a cooling water flow channel and respective manifold holes are formed. Reference numeral 502 designates an electrically conductive separator plate having, at a front surface thereof, a surface as shown in FIG. 3A, where a cooling water flow channel and respective manifold holes are formed, and having, at a rear surface thereof; a surface as shown in FIG. 3B, where a fuel gas flow channel and respective manifold holes are formed. These two separator plates are bonded to each other, with O-ring-like gas sealing members 527, 537*a* placed on the respective separator plates being pressed to each other, thereby forming a cooling water unit having a cooling water flow channel 511 by or between the two separator plates, and also forming a part of a fuel gas manifold 554 which penetrates the cell stack. In FIG. 5, gas sealing members 527 and 537*a* for encircling and sealing the fuel gas manifold 554 are partially shown.

Reference numeral 503 is an electrically conductive separator plate having, at a front surface thereof, a surface as shown in FIG. 1A where an oxidant gas flow channel and respective manifold holes are formed, and having, at a rear surface thereof, a surface as shown in FIG. 1B where a fuel gas flow channel and respective manifold holes are formed. Between the front surface of the separator plate 503 and the rear surface of the separator plate 502, an MEA as shown in FIG. 4 is sandwiched, the MEA comprising electrodes 540*a*, 540*b* sandwiching a polymer electrolyte membrane 541 having respective manifold holes. The electrode 540*a* faces and contacts a fuel gas flow channel 521, and the electrode 540*b* faces and contacts an oxidant gas flow channel 531*a*, thereby forming a unit cell also having a part of the fuel gas manifold 554. In FIG. 5, gas sealing members 537*b*, 547*a*, which are placed on the separator plates for encircling the fuel gas manifold 554, and which are pressed to each other indirectly via the polymer electrolyte membrane 541, are partially shown.

Reference numeral 504 is an electrically conductive separator plate having, at a front surface thereof, a surface as shown in FIG. 2A where an oxidant gas flow channel and respective manifold holes are formed, and having, at a rear surface thereof, a surface as shown in FIG. 2B where a cooling water flow channel and respective manifold holes are formed. Between the front surface of the separator plate 504 and the rear surface of the separator plate 503, an MEA as shown in FIG. 4 is sandwiched, the MEA comprising electrodes 550*a*, 550*b* sandwiching a polymer electrolyte membrane 551 having respective manifold holes. The electrode 550*a* faces and contacts a fuel gas flow channel 531*b*, and the electrode 550*b* faces and contacts an oxidant gas flow channel 561, thereby forming a unit cell also having apart of the fuel gas manifold 554. In FIG. 5, gas sealing members 547*b*, 557*a*, which are placed on the separator plates for encircling the fuel gas manifold 554, and which are pressed to each other indirectly via the polymer electrolyte membrane 551, are partially shown.

Reference numeral 505 is an electrically conductive separator plate having, at a front surface thereof, a surface as shown in FIG. 3A where a cooling water flow channel and respective manifold holes are formed, and having a planar rear surface. The separator plate 504 and the separator plate 505 are bonded to each other each other, with O-ring-like gas sealing members 557*b*, 567 placed on the respective separator plates being pressed to each other, thereby forming a cooling water unit having a cooling water flow channel 571 by or between the two separator plates, and also forming a part of a fuel gas manifold 554 which penetrates the cell stack. In FIG.

5, gas sealing members 557b and 567 for encircling and sealing the fuel gas manifold 554 are partially shown.

In the above manner, the combination of the two cooling units sandwiching the two-cell-stacked cell stack was formed. As shown in FIG. 5, such combination is further sandwiched between two current collecting plates 581a, 581b, each being made of copper having gold plating on the surface thereof. This sandwich structure is sandwiched between two insulating plates 582a, 582b made of resin material. Finally, the thus formed sandwich structure is further sandwiched between two end plates 583a, 583b made of SUS stainless steel. These current collecting plates 581a, 581b, insulating plates 582a, 582b and end plate 583a are also provided with manifold holes as parts of the fuel gas manifold.

A fuel gas is introduced from a fuel gas introduction pipe 554a welded to the end plate 583a, and is injected into the fuel gas manifold 554, which is an integration of the above-described parts of the fuel gas manifold. The injected fuel gas flows through fuel gas flow channels of the separator plates, and is exhausted to outside of the fuel cell through a fuel gas exhaust pipe 554b welded to the end plate 583b.

The above description mainly refers to the upper part as shown by the cross-sectional view in FIG. 5. As understandable therefrom, the lower part as shown by the front view in FIG. 5 has a structure similar to the upper part, although detailed description therefor is omitted here, except for the following brief description. That is, in the lower part, an oxidant gas is introduced from an oxidant gas introduction pipe 553a welded to the end plate 583a, and is injected into an oxidant gas manifold being formed to penetrate the separator plates. The oxidant gas flows through oxidant gas flow channels of the separator plates, and is then exhausted to outside of the fuel cell through an oxidant gas exhaust pipe 553b welded to the end plate 583b.

The stacked assembly as formed above is fixed by tightening members provided at four corners at each outer surface of each end plate. More specifically, through-holes are respectively provided at the four corners of each end plate. A tightening rod is provided to each such through-hole, and is provided with bolt and a washer or spring at an end thereof, and with a nut at the other end thereof, whereby a tightening pressure can be applied to the stacked assembly. Referring to FIG. 5, two each of such four kinds of tightening members are shown, namely bolts 592a, 595a, washers or springs 593, 596, tightening rods 591, 594 and nuts 592a, 595b. According to the structure as shown in FIG. 5, the two each of such four kinds of tightening members are designed to have their centers positioned on the cross-sectional plane as shown by the cross-sectional view with respect to the upper part of FIG. 5. In the manner as described above, a two-cell-stacked polymer electrolyte fuel cell according to the present Example was made.

The present specification including the present Example and other Examples refer to tightening pressure per area of the electrode and to tightening pressure per contact area of the electrode and the electrically conductive separator plate. Such tightening pressures can be measured by using a pressure sensor, but can also be obtained by using calculations as well. This will be described below.

First, tightening load of each sealing member or gasket can be obtained, by calculation, from the elastic recovery force of the sealing member. Subtracting this tightening load of the sealing member from the total tightening load applied to the cell stack, the tightening load applied to the electrode can be obtained. Further, dividing the thus calculated tightening load by the area of the electrode, the tightening pressure per area of the electrode can be obtained by such calculation.

Here, the total tightening load and the elastic recovery force of the sealing member can be obtained as follows. In the case that the cell stack is tightened, e.g., by a coil spring or a belleville spring, so as to receive a constant load, the total tightening load of the cell stack can be calculated by multiplying the spring constant by the elastic shrinkage amount or compression amount of the spring.

The elastic recovery force of the sealing member can be calculated as follows on the assumption that all the sealing members used have the same elastic shrinkage property. The shrinkage (compression) amount of the sealing member is so designed that each electrically conductive separator plate contacts each electrode with an optimum load when the sealing member shrinks by a certain shrinkage amount. More specifically, the design is made with known design parameters to control the pressure applied to the respective elements, such as the electrodes, by the shrinkage amount of each sealing member. Based on such design parameters, the elastic recovery force of the sealing member can be calculated when the sealing member shrinks with the certain shrinkage amount.

Alternatively, the shrinkage amount of the sealing member can be calculated as follows. That is, subtracting the length between the two end separator plates of the cell stack, after the tightening of the cell stack, from the corresponding length between the two end separator plates of the cell stack before the tightening, namely free length, the total shrinkage amount of the sealing members can be obtained. Since the cell stack has plural layers of sealing members, the total shrinkage amount of the sealing members is the sum of the shrinkage amounts of respective layers of sealing members. Accordingly, dividing the total shrinkage amount of the sealing members by the number of layers of sealing members, the shrinkage amount of the sealing member per layer of sealing members can be obtained.

Further, subtracting the elastic recovery force of the gas sealing members from the total tightening load of the cell stack, the tightening load applied to the electrode can be calculated. Lastly, dividing the tightening load to the electrode by the area of the electrode, the tightening pressure per area of the electrode can be obtained. Similarly, dividing the tightening load to the electrode by the contact area between the electrode and the separator plate, the tightening pressure per contact area between the electrode and the separator plate can be obtained.

Hereinafter, the experiments conducted in the present Example, using a two-cell-stacked fuel cell as prepared in the present Example and as shown in FIG. 5, will be described.

Various tightening pressures between 1 kgf/cm$^2$ and 10 kgf/cm$^2$ of area of the electrode were applied to the cell stack. More specifically, first, a tightening pressure of 1 kgf/cm$^2$ of area of the electrode was applied to the cell stack, and was subjected to measurements of power generation performance, short-circuit conductivity and hydrogen leak current. Thereafter, the tightening pressure was increased to a next one, and the same measurements as for the above the tightening pressures kgf/cm$^2$ were conducted. A combination of such increase of tightening pressure and measurements conducted at the increased tightening pressure was repeated.

For measuring the power generation performance of the fuel cell, the fuel cell according to the present Example was kept at 70° C., wherein a hydrogen-containing gas consisting of 80% hydrogen, 20% carbon dioxide gas and 10 ppm carbon monoxide gas and being humidified and heated to have a dew point of 68.5° C. was supplied to the fuel electrode, and air humidified and heated to have a dew point also of 70° C. was supplied to the oxidant electrode of the fuel cell.

Figure 9:
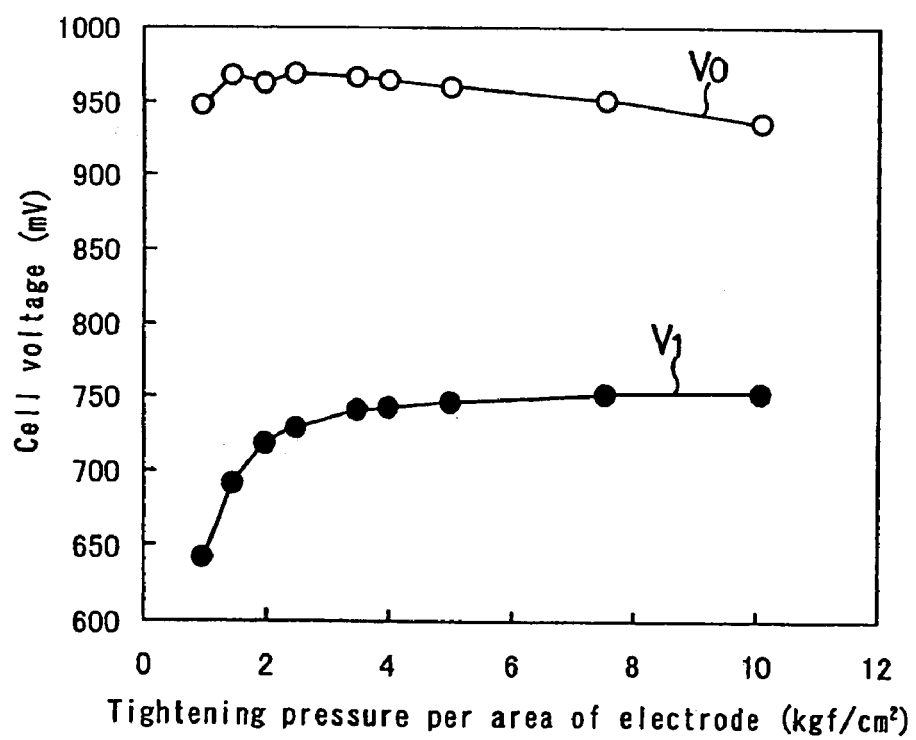
FIG. 9 is a graph showing the relation of the cell voltage to the tightening pressure per area of electrode for a fuel cell according to an Example of the present invention described below.

This fuel cell was then subjected to measurements of continuous power generation under the conditions of a fuel utilization rate of 80%, an oxygen utilization rate of 40% and an electric current density of 0.3 A/cm$^2$. FIG. 9 shows the results of such measurements per one unit cell of the fuel cell. In FIG. 9, V0 designates a characteristic curve of the open-circuit voltage, while V1 designates a characteristic curve of the cell voltage during power generation at a current density of 0.3 A/cm$^2$.

It was found therefrom that the open-circuit voltage V0 was not significantly affected by the tightening pressure, and started gradually decreasing when a tightening pressure was increased to about 6 kgf/cm$^2$ or more. However, the cell voltage V1 during power generation was significantly affected by the tightening pressure. At a tightening pressure below 2 kgf/cm$^2$, the cell voltages were extremely low. As the tightening pressure exceeded 2 kgf/cm$^2$, the cell voltage started gradually increasing, and at a tightening pressure of about 6 kgf/cm$^2$, it became substantially saturated. It has been found therefrom that the tightening pressure per area of electrode needs to be not lower than about 2 kgf/cm$^2$.

Next, in order to measure the short-circuit conductivity, the two-cell-stacked fuel cell according to the present Example was kept at 70° C., wherein a nitrogen gas humidified and heated to have a dew point of 68.5° C. was supplied to one of the electrodes of each unit cell, and also nitrogen gas humidified and heated to have a dew point of 70° C. was supplied to the other electrode of each fuel cell. After the gas atmosphere in each unit cell was sufficiently displaced by nitrogen, a DC voltage of 0.2 V per unit cell, total 0.4 V, was applied to the cell stack of the fuel cell. At a time point of 3 minutes after the application of the DC voltage, a steady-state current in the cell stack was measured. By subjecting the thus measured value to conversion calculation as described above, the short-circuit conductivity of each unit cell, namely each MEA, was obtained.

Figure 10:
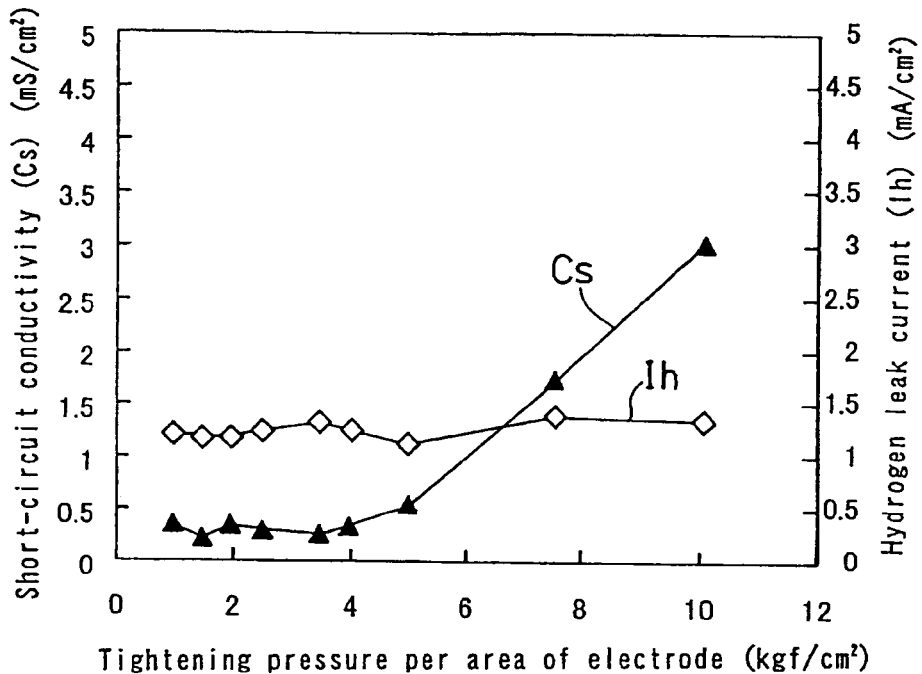
FIG. 10 is a graph showing the relation of the short-circuit conductivity and the hydrogen leak current to the tightening pressure per area of electrode for the same fuel cell as for FIG. 9.

Further, with the tightening pressure applied to the fuel cell for measuring the above short-circuit conductivity being maintained as it was, a hydrogen gas humidified and heated to have a dew point of 68.5° C. was supplied to one of the electrodes of each unit cell, and also nitrogen gas humidified and heated to have a dew point of 70° C. was supplied to the other electrode of each fuel cell. After the gas atmosphere in each unit cell was sufficiently displaced by the respective gases, a DC voltage of 0.2 V per unit cell, total 0.4 V, was applied to the cell stack of the fuel cell. At a time point of 3 minutes after the application of the DC voltage, a steady-state current in the cell stack was measured. By subjecting the thus measured value to the conversion calculation as described above, the total conductivity of each unit cell, namely each MEA, was obtained. Subtracting the above obtained short-circuit conductivity from the thus obtained total conductivity, a difference value therebetween was obtained. By subjecting the thus obtained difference value to the conversion calculation as described above, the hydrogen leak current of each unit cell was obtained. FIG. 10 shows the thus measured and obtained results, where Cs designates a characteristic curve of the short-circuit conductivity, and Ih designates a characteristic curve of the hydrogen leak current.

It was found therefrom that the short-circuit conductivity started increasing when the applied tightening pressure exceeded 4 kgf/cm$^2$ of area of the electrode, indicating that micro short-circuits started being generated at such tightening pressure exceeding 4 kgf/cm$^2$. However, the hydrogen leak current did not show any significant variation, and was substantially constant in the range of the experimental tightening pressures, without depending on the tightening pressures. From these results, it has been found that the tightening pressure needs to be not greater than about 4kgf/cm$^2$ of area of the electrode for the purpose of suppressing the generation of micro short-circuits.

Figure 13:
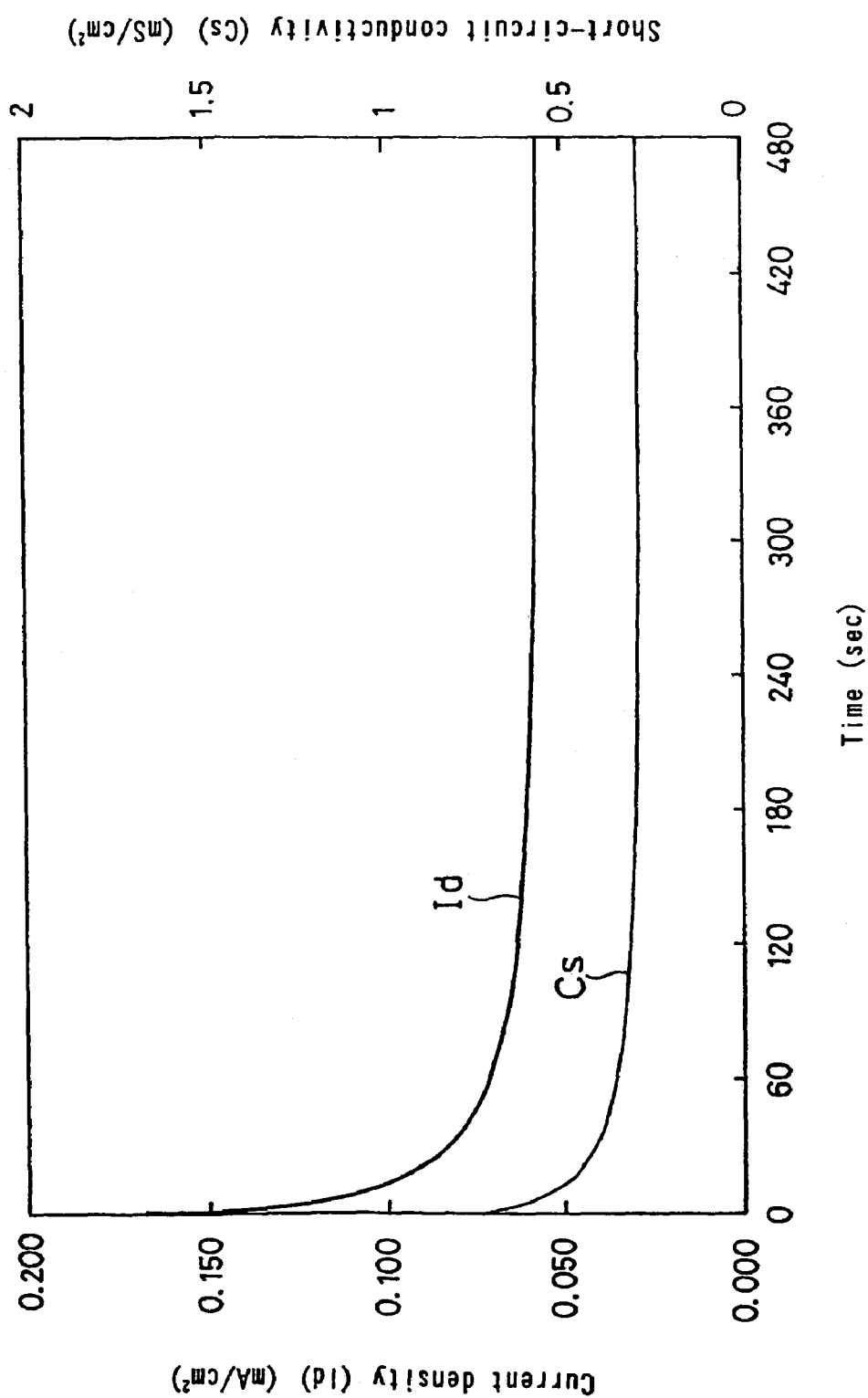
FIG. 13 is a graph showing the relation of the current density and the short-circuit conductivity to time for a fuel cell according to still another Example of the present invention described below.
Figure 14:
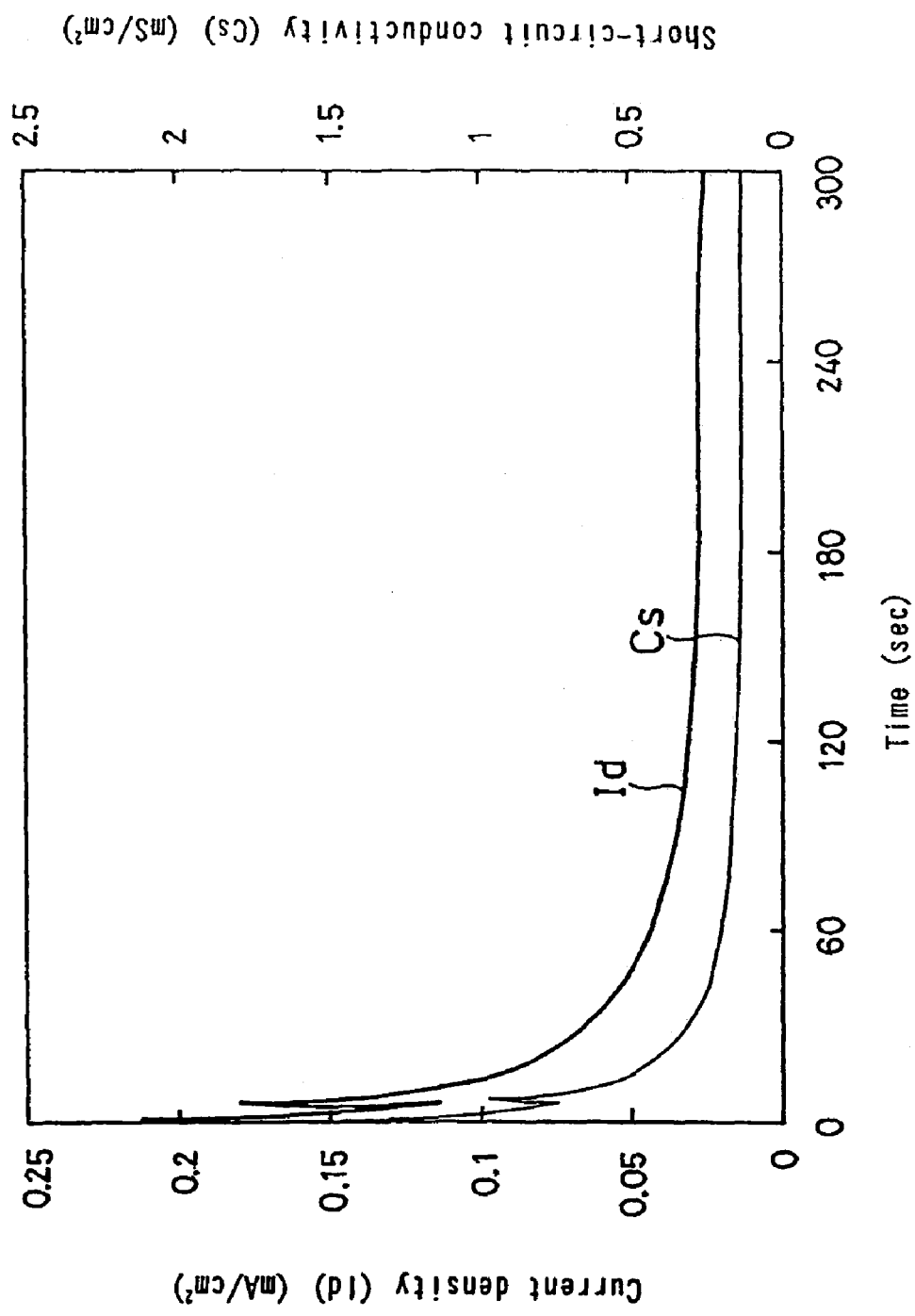
FIG. 14 is a graph showing the relation of the current density and the short-circuit conductivity to time for a structure as shown in FIG. 8.

In the above experiments, the current, as steady-state current, was measured at a time point of 3 minutes after the application of the DC voltage. This was done because the current reached a roughly steady-state level at a time point of 1 minute after the application of the DC voltage, and could well be recognized as substantially steady-state level at a time point of 3 minutes after the application of the DC voltage. This is also evident from the experimental results as shown by FIGS. 13 and 14, discussed later.

Next, two-cell-stacked fuel cells according to the present Example were subjected to durability test as follows. First, six of such fuel cells were prepared. To these fuel cells, tightening pressures of 1, 2, 4, 6, 8 and 10 kgf/cm$^2$ of area of electrode were applied, respectively. For measuring and examining the stability of the power generation performance of such fuel cells, each such fuel cell was kept at 70° C., wherein a hydrogen-containing gas consisting of 80% hydrogen, 20% carbon dioxide gas and 10 ppm carbon monoxide gas and being humidified and heated to have a dew point of 68.5° C. was supplied to the fuel electrode, and air humidified and heated to have a dew point also of 70° C. was supplied to the oxidant electrode of the fuel cell. Each fuel cell was then subjected to measurements of continuous power generation of 10,000 hours under the conditions of a fuel utilization rate of 80%, an oxygen utilization rate of 40% and an electric current density of 0.3 A/cm$^2$.

It was found that for the fuel cell having applied thereto the tightening pressure of 1 kgf/cm$^2$ of area of electrode, the power generation performance was already very bad at the initial stage. With respect to the fuel cells having applied thereto the tightening pressures of 2 kgf/cm$^2$ and 4 kgf/cm$^2$ of area of electrode, they were found to be good, showing average-cell voltage deterioration rates of 1 mV/1000 h (hours) and 1.5 mV/1000 h, respectively, during the 10,000 hour continuous power generation test. These two fuel cells were also subjected to the measurements of short-circuit conductivity and hydrogen leak current just after the 10,000 hour test in a manner as described above. As a result, they showed the same short-circuit conductivity and hydrogen leak current as those at the initial stage.

With respect to the fuel cell having applied thereto the tightening pressure of 6 kgf/cm$^2$ of area of electrode, it showed average cell voltage deterioration rate of 7 mV/1000 h up to 5000 hours after the start of the continuous test, but started showing abrupt decrease of the cell voltage at about 6000 hours after the start of the continuous test, and soon the cell voltage decreased to such level as to be impossible to continue its power generation any further.

Further, with respect to the to the fuel cell having applied thereto the tightening pressure of 8 kgf/cm$^2$ of area of electrode, it showed average cell voltage deterioration rate of 16 mV/1000 h up to 2000 hours after the start of the continuous test, but at about 3000 hours after the start of the continuous test, the cell voltage decreased to such level as to be impossible to continue its power generation any further.

Lastly, with respect to-the fuel cell having applied thereto the tightening pressure of 10 kgf/cm$^2$ of area of electrode, it showed average cell voltage deterioration rate of 120 mV/1000 h up to 800 hours after the start of the continuous test, but at about 1000 hours after the start of the continuous test, the cell voltage decreased to such level as to be impossible to continue its power generation any further.

Furthermore, the short-circuit conductivities and the hydrogen leak currents of the fuel cells having applied thereto the tightening pressures of 6, 8 and 10 kgf/cm$^2$ of area of electrode were measured after the continuous power generation measurements. It was found therefrom that the short-circuit conductivities and the hydrogen leak currents of such fuel cells increased by about 2 digits (2 orders of magnitude) from their initial levels.

EXAMPLE 2

In a similar manner as described above in Example 1 with reference to FIG. 5, except for a few changes made here, a two-cell-stacked polymer electrolyte fuel cell according to the present Example 2 was prepared. The few changes were that in place of the carbon paper as used in Example 1, a carbon cloth (product of Nippon Carbon Co., Ltd.) having the same outer dimensions as the carbon paper and having a thickness of 300 μm was used, and that the grooves 11$a$, 11$b$ of each electrically conductive separator plate were designed here to have a groove width of 0.8 mm and groove depth of 1.0 mm in place of 1.0 mm and 0.7 mm, respectively, in Example 1.

Hereinafter, the experiments conducted in the present Example 2, using such two-cell-stacked fuel cell as prepared in the present Example will be described.

Various tightening pressures between 2 kgf/cm$^2$ and 20 kgf/cm$^2$ of contact area between the electrode and the separator plate were applied to the cell stack. More specifically, first, a tightening pressure of 2 kgf/cm$^2$ of contact area of the electrode and the separator plate was applied to the cell stack, and was subjected to measurements of power generation performance, short-circuit conductivity and hydrogen leak current. Thereafter, the tightening pressure was increased to a next one, and the same measurements as for the tightening pressure of 2 kgf/cm$^2$ above were conducted. A combination of such increase of tightening pressure and measurements at the increased tightening pressure was repeated.

For measuring the power generation performance of the fuel cell, the fuel cell according to the present Example 2 was kept at 70° C., wherein a hydrogen-containing gas consisting of 80% hydrogen, 20% carbon dioxide gas and 10 ppm carbon monoxide gas and being humidified and heated to have a dew point of 68.5° C. was supplied to the fuel electrode, and air humidified and heated to have a dew point also of 70° C. was supplied to the oxidant electrode of the fuel cell. This fuel cell was then subjected to measurements of continuous power generation under the conditions of a fuel utilization rate of 80%, an oxygen utilization rate of 40% and an electric current density of 0.3 A/cm$^2$.

Figure 11:
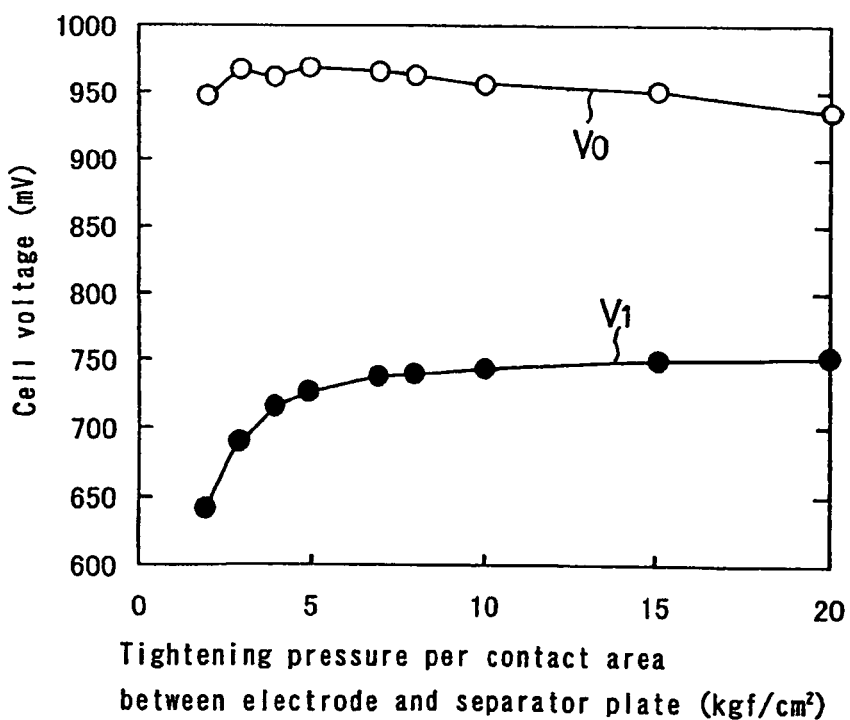
FIG. 11 is a graph showing the relation of the cell voltage to the tightening pressure per contact area between electrode and separator plate for a fuel cell according to another Example of the present invention described below.

FIG. 11 shows the results of such measurements per one unit cell of the fuel cell. In FIG. 11, V0 designates a characteristic curve of the open-circuit voltage, while V1 designates a characteristic curve of the cell voltage during power generation at a current density of 0.3 A/cm$^2$.

It was found therefrom that the open-circuit voltage was not significantly affected by the tightening pressure, and started gradually decreasing when a tightening pressure was increased to about 12 kgf/cm$^2$ or more of contact area between electrode and separator plate. However, the cell voltage during power generation was significantly affected by the tightening pressure. At a tightening pressure below 4 kgf/cm$^2$ of contact area between electrode and separator plate, the cell voltages were extremely low. As the tightening pressure exceeded 4 kgf/cm$^2$ of contact area between electrode and separator plate, the cell voltage started gradually increasing, and at a tightening pressure of about 12 kgf/cm$^2$ of contact area between electrode and separator plate, it became substantially saturated. It has been found therefrom that the tightening pressure per contact area between electrode and separator plate needs to be not less than about 4 kgf/cm$^2$.

Next, in order to measure the short-circuit conductivity, the two-cell-stacked fuel cell according to the present Example 2 was kept at 70° C., wherein a nitrogen gas humidified and heated to have a dew point of 68.5° C. was supplied to one of the electrodes of each unit cell, and also nitrogen gas humidified and heated to have a dew point of 70° C. was supplied to the other electrode of each fuel cell. After the gas atmosphere in each unit cell was sufficiently displaced by nitrogen, a DC voltage of 0.2 V per unit cell, total 0.4 V, was applied to the cell stack of the fuel cell. At a time point of 3 minutes after the application of the DC voltage, a steady-state current in the cell stack was measured. By subjecting the thus measured value to conversion calculation as described above, the short-circuit conductivity of each unit cell, namely each MEA, was obtained.

Figure 12:
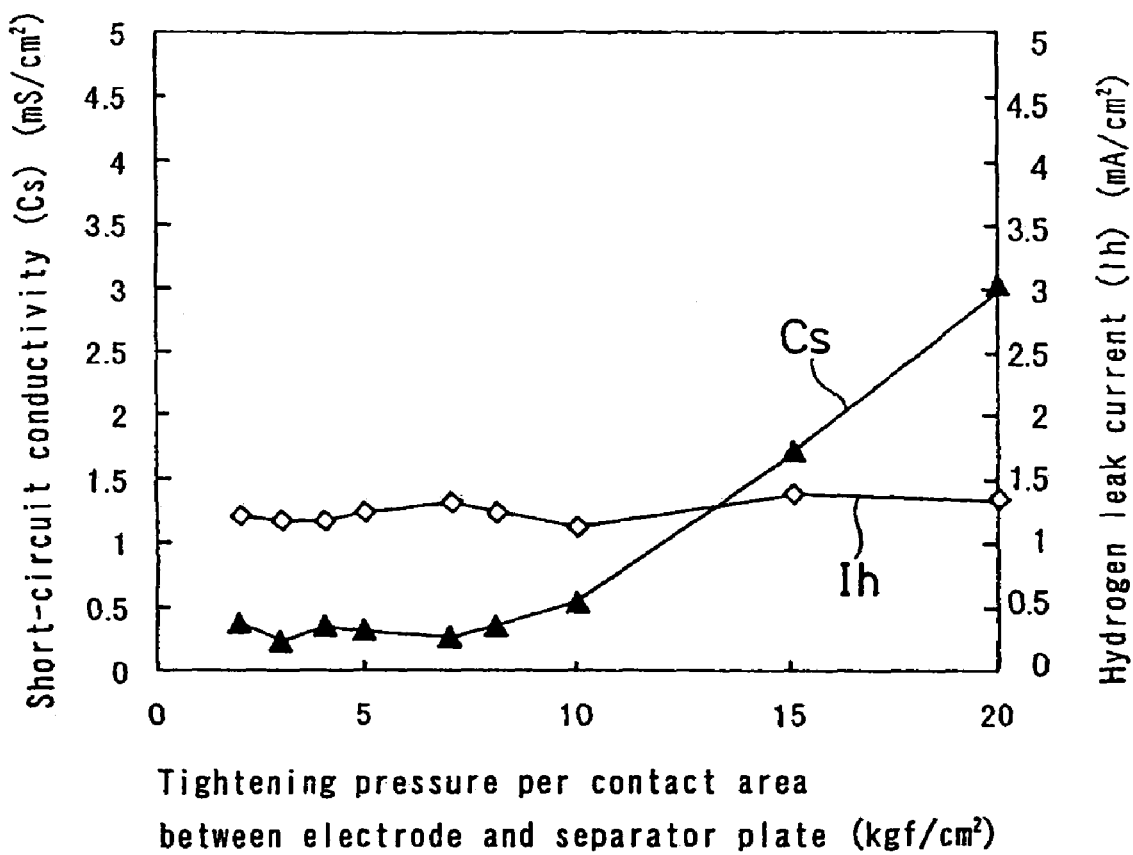
FIG. 12 is a graph showing the relation of the short-circuit conductivity and the hydrogen leak current to the tightening pressure per contact area between electrode and separator plate for the same fuel cell as for FIG. 11.

Further, with the tightening pressure applied to the fuel cell for measuring the above short-circuit conductivity being maintained as it was, a hydrogen gas humidified and heated to have a dew point of 68.5° C. was supplied to one of the electrodes of each unit cell, and also nitrogen gas humidified and heated to have a dew point of 70° C. was supplied to the other electrode of each fuel cell. After the gas atmosphere in each unit cell was sufficiently displaced by the respective gases, a DC voltage of 0.2 V per unit cell, total 0.4 V, was applied to the cell stack of the fuel cell. At a time point of 3 minutes after the application of the DC voltage, a steady-state current in the cell stack was measured. By subjecting the thus measured value to the conversion calculation as described above, the total conductivity of each unit cell, namely each MEA, was obtained. Subtracting the above obtained short-circuit conductivity from the thus obtained total conductivity, a difference value therebetween was obtained. By subjecting the thus obtained difference value to the conversion calculation as described above, the hydrogen leak current of each unit cell was obtained. FIG. 12 shows the thus measured and obtained results, where Cs designates a characteristic curve of the short-circuit conductivity, and Ih designates a characteristic curve of the hydrogen leak current.

It was found therefrom that the short-circuit conductivity Cs started increasing when the applied tightening pressure exceeded 8 kgf/cm$^2$ of contact area between electrode and separator plate, indicating that micro short-circuits started being generated at such tightening pressure exceeding 8 kgf/cm$^2$ of contact area between electrode and separator plate. However, the hydrogen leak current Ih did not show any significant variation, and was substantially constant in the range of the experimental tightening pressures, without depending on the tightening pressures. From these results, it has been found that the tightening pressure needs to be not greater than about 8 kgf/cm$^2$ of contact area between electrode and separator plate for the purpose of suppressing the generation of micro short-circuits.

Next, two-cell-stacked fuel cells according to the present Example 2 were subjected to durability test as follows. First, six of such fuel cells were prepared. To these fuel cells, tightening pressures of 2, 4, 8, 12, 16 and 20 kgf/cm$^2$ of contact area between electrode and separator plate were applied, respectively. For measuring and examining the stability of the power generation performance of such fuel cells, each such fuel cell was kept at 70° C., wherein a hydrogen-containing gas consisting of 80% hydrogen, 20% carbon dioxide gas and 10 ppm carbon monoxide gas and being humidified and heated to have a dew point of 68.5° C. was supplied to the fuel electrode, and air humidified and heated to have a dew point also of 70° C. was supplied to the oxidant electrode of the fuel cell. Each fuel cell was then subjected to measurements of continuous power generation of 10,000 hours under the conditions of a fuel utilization rate of 80%, an oxygen utilization rate of 40% and an electric current density of 0.3 A/cm$^2$.

It was found that for the fuel cell having applied thereto the tightening pressure of 2 kgf/cm$^2$ of contact area between electrode and separator plate, the power generation performance was already very bad at the initial stage. With respect to the fuel cells having applied thereto the tightening pressures of 4 kgf/cm$^2$ and 8 kgf/cm$^2$ of contact area between electrode and separator plate, they were found to be good, showing average cell voltage deterioration rates of 1 mV/1000 h (hours) and 1.5 mV/1000 h, respectively, during the 10,000 hour continuous power generation test. These two fuel cells were also subjected to the measurements of short-circuit conductivity and hydrogen leak current just after the 10,000 hour test in a manner as described above. As a result, they showed the same short-circuit conductivity and hydrogen leak current as those at the initial stage.

With respect to the to the fuel cell having applied thereto the tightening pressure of 12 kgf/cm$^2$ of contact area between electrode and separator plate, it showed average cell voltage deterioration rate of 7 mV/1000 h up to 5000 hours after the start of the continuous test, but started showing abrupt decrease of the cell voltage at about 6000 hours after the start of the continuous test, and soon the cell voltage decreased to such level as to be impossible to continue its power generation any further.

Further, with respect to the to the fuel cell having applied thereto the tightening pressure of 16 kgf/cm$^2$ of contact area between electrode and separator plate, it showed average cell voltage deterioration rate of 16 mV/1000 h up to 2000 hours after the start of the continuous test, but at about 3000 hours after the start of the continuous test, the cell voltage decreased to such level as to be impossible to continue its power generation any further.

Lastly, with respect to the fuel cell having applied thereto the tightening pressure of 20 kgf/cm$^2$ of contact area between electrode and separator plate, it showed average cell voltage deterioration rate of 120 mV/1000 h up to 800 hours after the start of the continuous test, but at about 1000 hours after the start of the continuous test, the cell voltage decreased to such level as to be impossible to continue its power generation any further.

Furthermore, the short-circuit conductivities and the hydrogen leak currents of the fuel cells having applied thereto the tightening pressures of 12, 16 and 20 kgf/cm$^2$ of contact area between electrode and separator plate were measured after the continuous power generation measurements. It was found therefrom that the short-circuit conductivities and the hydrogen leak currents of such fuel cells increased by about 2 digits from their initial levels.

EXAMPLE 3

For measuring of the conductivity of an MEA in a unit cell attributed to DC resistance component, namely short-circuit conductivity alone, without measuring the hydrogen leak current and power generation performance, it is possible to conduct the measurements in air at room temperature. This is a convenient and handy way of measurement. Such way of measurement will be described in the present Example 3.

A unit cell according to the present Example 3 was made in a manner similar to that in Example 2, using a carbon cloth and electrically conductive separator plates having grooves, for gas flow, each having a groove width of 0.8 mm and a groove depth of 1.0 mm, as follows.

First, an electrically conductive separator plate as shown by the separator plate designated by reference numeral 502 in FIG. 5 was prepared, which had a front surface as shown in FIG. 3A with a cooling water flow channel and a rear surface as shown in FIG. 3B with a fuel gas flow channel. Next, a further electrically conductive separator plate as shown by the separator plate designated by reference numeral 504 in FIG. 5 was prepared, which had a front surface as shown in FIG. 2A with an oxidant gas flow channel and a rear surface as shown in FIG. 2B with a cooling water flow channel. Between these two separator plates, an MEA made of a polymer electrolyte membrane as shown by the membrane designated by reference numeral 541 in FIG. 5 and as shown in FIG. 4 and of electrodes as shown by 540a, 540b in FIG. 5 was sandwiched so that the respective gas flow channels of the separator plates contacted the respective electrodes.

The thus made unit cell was sandwiched between two rigid insulating plates having planar major surfaces. This sandwich assembly of the unit cell and the insulating plates was sandwiched by a press having two opposing and planar pressing surfaces, so that the pressing surfaces contacted the insulating plates. Further, two electric leads were attached to the respective separator plates for applying a voltage to the unit cell.

Using the press, a pressure or tightening pressure of 6 kgf/cm$^2$ of contact area between electrode and separator plate was applied to the sandwich assembly. Further, a constant DC voltage of 0.2 V was applied to the unit cell, and the short-circuit conductivity of the unit cell, namely MEA, was measured. FIG. 13 shows the results of such measurements having been conducted at room temperature in air having a humidity of 24%. In FIG. 13, Id designates a characteristic curve of current density and Cs designates a characteristic curve of short-circuit conductivity.

For measuring the short-circuit conductivity Cs, it is necessary to separate the DC resistance component, being based on electronic conductivity, from ionic conductivity of the polymer electrolyte membrane, thereby extracting only the DC resistance component. Such separation becomes possible by applying a DC voltage or a DC current to the electrolyte membrane for a sufficient time for the following reason. By the application of such DC voltage or DC current, the ionic conductor starts its polarization, which continues for a long time to end. Accordingly, an infinite time is needed ideally. However, from a practical point of view, the current or voltage attributed to the ionic conductivity becomes negligibly low when sufficient time passes after the application of the DC voltage or the DC current. Consequently, the DC resistance component attributed to the ionic conductivity becomes negligibly low then. FIG. 13 indicates such phenomenon.

Accordingly, dividing the applied constant DC voltage by the current value measured sufficiently after the application of the DC voltage, the resistance value attributed to the DC resistance component alone can be obtained. By inverting the resistance value, the short-circuit conductivity can be obtained. Here, in order to minimize the influence of the ionic conductivity of the polymer electrolyte membrane, it is preferable to place the electrolyte membrane under a condition, where the electrolyte membrane hardly exhibits its ionic conductivity, which is a dry atmosphere. This is why the measurements were conducted at a humidity of 24% as described above, wherein actually the stack assembly was placed in a thermo-hygrostat chamber.

The application of a DC voltage of 0.2 V to the unit cell according to the present Example for measuring the current value and short-circuit conductivity was conducted 20 times. As a result, similar results were obtained with good reproducibility. Since the decay curves of the current value and short-circuit conductivity with respect to time decays logarithmically, those values measured longer after the application of the DC voltage indicate more intrinsic short-circuit conductivities. However, for the purpose of efficiently conducting the measurements, sufficient time at which the measurements should be conducted has been found to be when the gradient of each decay curve becomes −0.0025 or lower. This is based on a study as to the reproducibility of the relation between the gradient of the current value decay curve at a certain time point and the short-circuit conductivity obtained, by calculation, from the current value at the certain time point. According to the present Example 3, it was about 1 minute after the application of the DC voltage, when the gradient of the current value decay curve became −0.0025 or lower.

EXAMPLE 4

According to the present Example, 11 fuel cells of two-cell-stacked type made in a manner similar to that in Example 2 were prepared.

At each of the four tightening members at the four corners of each fuel cell, a tightening load selected from the range of 100 kg to 1 ton was evenly applied, thereby applying thereto a total load selected from 400 kg to 4 tons, after which measurements of short-circuit conductivity and hydrogen leak current were conducted as to each fuel cell. The tightening pressures were so selected as to obtain targeted short-circuit conductivities.

For example, to one of the 11 fuel cells, a total tightening load was so adjustably selected from 400 kg that the short-circuit conductivity measured in a manner as described in Example 2 above became 0.2 mS/cm$^2$. Likewise, to the other 10 fuel cells, total tightening loads selected from the range of 400 kg to 4 tons were respectively applied, such that the resultant short-circuit conductivities measured in a manner described in Example 2 became 0.4, 0.6, 0.8, 1.0, 1.2, 1.4, 1.5, 1.6, 1.8 and 2.0 mS/cm$^2$, respectively.

These 11 fuel cells were subjected to measurements of continuous power generation, namely durability test, under conditions the same as those in Example 2 with a fuel utilization rate of 80%, an oxygen utilization rate of 40% and an electric current density of 0.3 A/cm$^2$.

As a result, it was found that the fuel cells having initial short-circuit conductivities of 0.2, 0.4, 0.6 and 0.8 mS/cm$^2$ showed good durability, showing average cell voltage deterioration rates of 1 mV/1000 h in a continuous power generation of 10,000 hours. Further, their short-circuit conductivities and hydrogen leak currents were unchanged from the corresponding initial values, after the 10,000 hour power generation.

The fuel cell having an initial short-circuit conductivity of 1.0 mS/cm$^2$ showed good durability, showing average cell voltage deterioration rate of 1.5 mV/1000 h in a continuous power generation of 10,000 hours. Further, its short-circuit conductivity and hydrogen leak current were unchanged from the corresponding initial values, after the 10,000 hour power generation.

Further, the fuel cells having initial short-circuit conductivities of 1.2, 1.4 and 1.5 mS/cm$^2$ showed good durability to some extent in a continuous power generation of 10,000 hours, showing average cell voltage deterioration rates of 2.5 mV/1000 h. Further, when their short-circuit conductivities and hydrogen leak currents were measured after the 10,000 hour power generation, their hydrogen leak currents were unchanged from the corresponding initial values, but their short-circuit conductivities were greater, by about 20%, than the corresponding initial values.

On the other hand, the fuel cell having an initial short-circuit conductivity of 1.6 mS/cm$^2$ showed average cell voltage deterioration rate of 7 mV/1000 h up to 5000 hours after the start of the power generation, but started showing abrupt decrease of the cell voltage at about 6000 hours after the start of the power generation, and soon the cell voltage decreased to such level as to be impossible to continue its power generation any further. Similarly, the fuel cell having an initial short-circuit conductivity of 1.8 mS/cm$^2$ showed average cell voltage deterioration rate of 16 mV/1000 h up to 2000 hours after the start of the power generation, but at about 3000 hours after the start of the power generation, the cell voltage decreased to such level as to be impossible to continue its power generation any further.

Lastly, the fuel cell having an initial short-circuit conductivity of 2.0 mS/cm$^2$ showed average cell voltage deterioration rate of 120 mV/1000 h up to 800 hours after the start of the continuous test, but at about 1000 hours after the start of the power generation, the cell voltage decreased to such level as to be impossible to continue its power generation any further.

Furthermore, the short-circuit conductivities and the hydrogen leak currents of the fuel cells having initial short-circuit conductivities of 1.6, 1.8 and 2.0 mS/cm$^2$ were measured after the continuous power generation measurements. It was found therefrom that the short-circuit conductivities and the hydrogen leak currents of such fuel cells increased by about 2 digits from their initial levels.

EXAMPLE 5

According to the present Example, 9 fuel cells of two-cell-stacked type made in a manner similar to that in Example 2 were prepared.

At each of the four tightening members at the four corners of each fuel cell, a tightening load selected from the range of 100 kg to 1 ton was evenly applied, thereby applying thereto a total load selected from 400 kg to 4 tons, after which measurements of short-circuit conductivity and hydrogen leak current were conducted as to each fuel cell. The tightening pressures were so selected as to obtain targeted hydrogen leak current values.

For example, to one of the 9 fuel cells, a total tightening load was so adjustably selected from 400 kg that the hydrogen leak current measured in a manner as described in Example 2 above became 1.2 mA/cm$^2$. Likewise, to the other 10 fuel cells, total tightening loads selected from the range of 400 kg to 4 tons were respectively applied, such that the resultant hydrogen leak current values measured in a manner described in Example 2 became 1.6, 2.0, 2.4, 2.8, 3.0, 3.2, 3.6 and 4.0 mA/cm$^2$, respectively.

These 9 fuel cells were subjected to measurements of continuous power generation, namely durability test, under conditions the same as those in Example 2 with a fuel utilization rate of 80%, an oxygen utilization rate of 40% and an electric current density of 0.3 A/cm$^2$.

As a result, it was found that the fuel cells having initial hydrogen leak currents of 1.2, 1.6 and 2.0 mA/cm$^2$ showed good durability, showing average cell voltage deterioration rates of 1 mV/1000 h in a continuous power generation of 10,000 hours. Further, their short-circuit conductivities and hydrogen leak currents were unchanged from the corresponding initial values, after the 10,000 hour power generation.

The fuel cell having an initial hydrogen leak current of 2.4 mA/cm$^2$ showed good durability, showing average cell voltage deterioration rate of 1.5 mV/1000 h in a continuous power generation of 10,000 hours. Further, its short-circuit conductivity and hydrogen leak current were unchanged from the corresponding initial values, after the 10,000 hour power generation.

Further, the fuel cells having initial hydrogen leak currents of 2.8 and 3.0 mA/cm$^2$ showed good durability to some extent in a continuous power generation of 10,000 hours, showing average cell voltage deterioration rates of 2.5 mV/1000 h. Further, when their short-circuit conductivities and hydrogen leak currents were measured after the 10,000 hour power generation, their hydrogen leak currents were unchanged from the corresponding initial values, but their short-circuit conductivities were greater, by about 20%, than the corresponding initial values.

On the other hand, the fuel cell having an initial hydrogen leak current of 3.2 mA/cm$^2$ showed average cell voltage deterioration rate of 7 mV/1000 h up to 5000 hours after the start of the power generation, but started showing abrupt decrease of the cell voltage at about 6000 hours after the start of the power generation, and soon the cell voltage decreased to such level as to be impossible to continue its power generation any further. Similarly, the fuel cell having an initial hydrogen leak current of 3.6 mA/cm$^2$ showed average cell voltage deterioration rate of 16 mV/1000 h up to 2000 hours after the start of the power generation, but at about 3000 hours after the start of the power generation, the cell voltage decreased to such level as to be impossible to continue its power generation any further.

Lastly, the fuel cell having an initial hydrogen leak current of 4.0 mA/cm$^2$ showed average cell voltage deterioration rate of 120 mV/1000 h up to 800 hours after the start of the continuous test, but at about 1000 hours after the start of the power generation, the cell voltage decreased to such level as to be impossible to continue its power generation any further.

Furthermore, the short-circuit conductivities and the hydrogen leak currents of the fuel cells having initial hydrogen leak currents of 3.2, 3.6 and 4.0 mA/cm$^2$ were measured after the continuous power generation measurements. It was found therefrom that the short-circuit conductivities and the hydrogen leak currents of such fuel cells increased by about 2 digits from their initial levels.

It is to be noted that the hydrogen leak currents can also be measured, e.g., by using well-known cyclic voltammetry (CV) other than the above-described manner. The following method of measurement is a specific example of such cyclic voltammetry. Hydrogen gas humidified and heated to have a dew point of 68.5° C. is supplied to the fuel electrode of the MEA of the fuel cell, and nitrogen humidified and heated to have a dew point of 70° C. is supplied to the oxidant electrode of the fuel cell. Such gas supply is continued until the pre-existing gases at the electrodes are sufficiently displaced by the hydrogen gas and nitrogen gas. Thereafter, the oxidant electrode having been supplied with nitrogen is swept from the equilibrium potential to +1.0 V by a sweeping rate of 50 mV/s under the single sweep operation, with the fuel electrode having been supplied with hydrogen being used as a reference electrode, thereby conducting the CV measurement. Dividing the thus measured leak current value by the area of the electrode, the hydrogen leak current per area of the electrode can be obtained.

EXAMPLE 6

In a manner similar to that in Example 2, two-cell-stacked fuel cells according to the present Example 6 were made, except that here the groove widths and the groove depths of used electrically conductive separator plates were varied, with the rib width between neighboring gas groove branches being unchanged and fixed at 1.0 mm.

More specifically, 8 kinds of separator plate groups were made, varying the groove widths of gas flow channels between 0.6 and 2.0 mm, and the groove depths between 0.2 and 1.1 mm as listed in the following Table 1, such that the gas flow velocity in each gas flow channel was maintained substantially constant. For realizing the constant gas flow velocity, the number of groove branches of each gas flow channel was also adjusted. Using these 8 groups of separator plates, 8 fuel cells were made in a manner similar to that according to Example 2. These 8 fuel cells are listed in Table 1 by Fuel Cell Numbers 1 to 8, respectively.

TABLE 1

|  | Fuel Cell Number | | | | | | | |
| --- | --- | --- | --- | --- | --- | --- | --- | --- |
|  | 1 | 2 | 3 | 4 | 5 | 6 | 7 | 8 |
| Groove width of gas flow channel (mm) | 0.6 | 0.8 | 0.8 | 1.0 | 1.0 | 1.0 | 1.2 | 2.0 |
| Groove depth of gas flow channel (mm) | 1.1 | 1.1 | 1.0 | 1.0 | 0.3 | 0.2 | 0.5 | 0.2 |

Various tightening pressures between 2 kgf/cm$^2$ and 20 kgf/cm$^2$ of contact area between electrode and separator plate were applied to the cell stack of each of the 8 fuel cells. More specifically, first, a tightening pressure of 2 kgf/cm$^2$ of contact area between electrode and separator plate was applied to the cell stack, and was subjected to measurements of power generation performance, short-circuit conductivity and hydrogen leak current. Thereafter, the tightening pressure was increased to a next one, and the same measurements as for the tightening pressure of 2 kgf/cm$^2$ above were conducted. A combination of such increase of tightening pressure and measurements at the increased tightening pressure was repeated.

It was found therefrom that the short-circuit conductivity started increasing when the applied tightening pressure exceeded 8 kgf/cm$^2$ of contact area between electrode and separator plate, indicating that micro short-circuits started being generated at such tightening pressure exceeding 8 kgf/cm$^2$ of contact area between electrode and separator plate. However, the hydrogen leak current did not show any significant variation, and was substantially constant in the range of the experimented tightening pressures, without depending on the tightening pressures. From these results, it has been found that the tightening pressure needs to be not greater than about 8 kgf/cm$^2$ of contact area between electrode and separator plate for the purpose of suppressing the generation of micro short-circuits.

Next, 8 of such two-cell-stacked fuel cells according to the present Example were again prepared. To these fuel cells, tightening pressures of 6 kgf/cm$^2$ of contact area between electrode and separator plate were applied. Then, these fuel cells were subjected to a power generation test, namely, measurements of initial power generation as follows. For measuring the power generation performance of such fuel cells, each such fuel cell was kept at 70° C., wherein a hydrogen-containing gas consisting of 80% hydrogen, 20% carbon dioxide gas and 10 ppm carbon monoxide gas and being humidified and heated to have a dew point of 68.5° C. was supplied to the fuel electrode, and air humidified and heated to have a dew point also of 70° C. was supplied to the oxidant electrode of the fuel cell. The measurements were conducted under conditions of a fuel utilization rate of 80%, an oxygen utilization rate of 40% and an electric current density of 0.3 A/cm².

As a result, all Fuel Cell Numbers 1 to 8 showed good open-circuit voltage of 0.980 to 0.985 V. By the power generation test, Fuel Cell Numbers 3 to 5 showed good cell voltages between 0.73 and 0.74 V, whereas the other Fuel Cell Numbers 1, 2, 6, 7 and 8 showed worse cell voltages lower than 0.7 V. Reasons for such worse cell voltages are considered to be because, in the case of Fuel Cell Numbers 1 and 2, the groove widths were too small relative to the rib width, so that the total area of each electrode facing and corresponding to the gas flow groove was too small. Further, in the case of Fuel Cell Numbers 7 and 8, the reasons for such worse cell voltages are considered to be because the contact area between the rib between gas flow channel was too small, resulting in too high contact resistance therebetween, while in the case of Fuel Cell Number 6, the groove depth of the gas flow channel was too small, resulting in impairment of gas supply to the groove of the gas flow channel.

EXAMPLE 7

First, 100 sheets of MEAs were made in a manner similar to that in Example 2.

Figure 8:
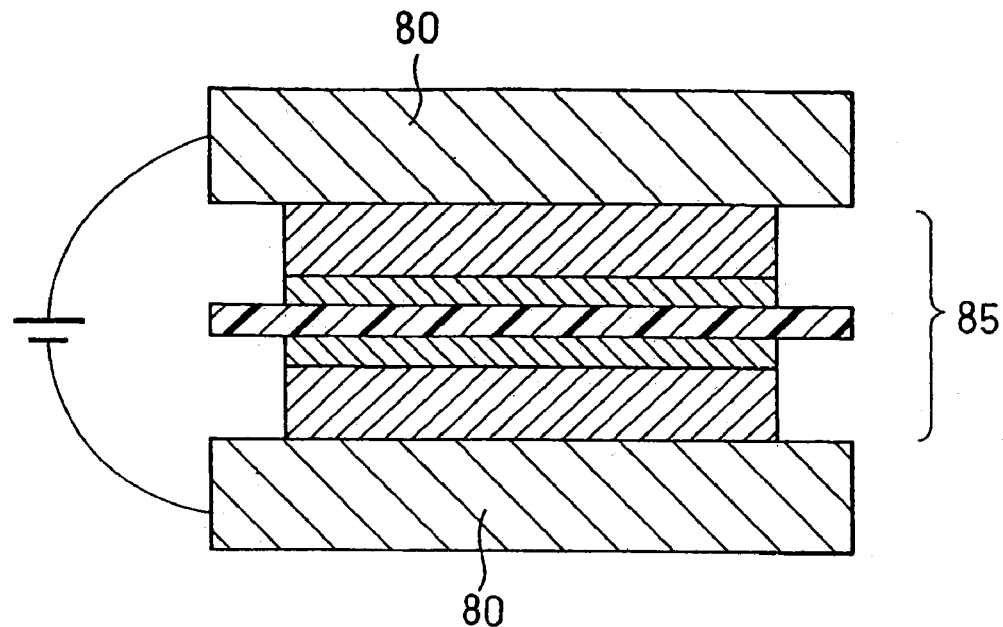
FIG. 8 is a schematic cross-sectional view of a structure used in an Example of the present invention described below, in which an MEA is sandwiched by two current collecting plates.

The short-circuit conductivity of one of the MEAs was measured in the following manner. This will be described with reference to FIG. 8. Referring to FIG. 8, an MEA 85 was sandwiched between two current collecting plates 80 each made of a 5 mm thick copper plate having gold plating on each surface thereof, thereby forming a sandwich assembly, which was placed to be flat horizontally, so that the weight of one current collecting plate on the MEA was the weight applied to the MEA. This sandwich assembly of the MEA with the current collecting plates was placed in a thermohygrostat chamber at a temperature of 25° C. and humidity of 30%. Then, a constant DC voltage of 0.2 V was applied between the current collecting plates, whereby the variation, with time, of the current value was measured. From the current value, the short-circuit conductivity of the MEA was obtained by calculation. The result of the measurement is shown in FIG. 14, which is a graph showing the relation of the current density Ih and the short-circuit conductivity Cs to time. Since the gradient of the decay curve of the current value, namely current density, was −0.022 at a time point of 1 minute after the application of the DC voltage, the short-circuit conductivity was obtained, by calculation, from the current value measured at such one minute point.

Next, using the above 100 MEAs, 100 unit cells were made in a manner similar to that in Example 3. That is, each such unit cell had such a structure that with reference to FIG. 5, each MEA was sandwiched between an electrically conductive separator plate as shown by reference numeral 502 and a further electrically conductive separator plate as shown by reference numeral 504. Using each of the 100 unit cells as well as two insulating plates, a press and two electric leads as used in Example 3, the short-circuit conductivity of each such MEA, was measured in a manner similar to that in Example 3. As a result, out of the 100 unit cells or MEAs, 70 of those showed short-circuit conductivities of 0.5 mS/cm² or lower, while 15 of those showed short-circuit conductivities greater than 0.5 but not greater than 1.0 mS/cm². On the other hand, 10 of the remaining 15 unit cells showed short-circuit conductivities greater than 1.0 but not greater than 1.5 mS/cm², while the remaining 5 showed short-circuit conductivities greater than 1.5 mS/cm².

In a manner as will be described below, a 100 cell-stacked cell stack was made, such that the MEAs were stacked in the order of the short-circuit conductivity of the MEAs, and that one cooling unit was provided for every unit cell. Here, the unit cell having the lowest short-circuit conductivity was referred to as Cell No. 1, while that having the highest short-circuit conductivity was referred to as Cell No. 100.

First, an electrically conductive separator plate, such as shown by reference numeral 501 in FIG. 5, having a planar front surface (left side in the cross-sectional view) and a cooling water channel at a rear surface thereof was prepared as a leftmost separator plate. On the rear surface of the leftmost separator plate, the unit cell of Cell No. 1 was placed in a manner that one surface of one separator plate of Cell No. 1 as shown in FIG. 3A having a cooling water flow channel contacted the rear surface of the leftmost separator plate. Next, on the rear surface of the other separator plate of Cell No. 1 as shown in FIG. 2B having a cooling water flow channel, the unit cell of Cell No. 2 was placed in a manner that one surface of Cell No. 2 as shown in FIG. 3A having a cooling water flow channel contacted the rear surface of the other separator plate of Cell No. 1 as shown in FIG. 2B. In the same manner, each unit cell having a Cell number greater by one than that of each already placed unit cell was placed, and this process was repeated to the last unit cell of Cell No. 100.

As a rightmost separator plate, an electrically conductive separator plate such as shown by reference numeral 505 in FIG. 5, having a planar rear surface (right side in the cross-sectional view) and a cooling water channel at a front surface thereof was prepared. This rightmost separator plate was placed on the unit cell of Cell No. 100 in a manner that the front surface of the right most separator plate contacted the outer surface of the unit cell of Cell No.100 as shown in FIG. 2B having a cooling water flow channel, thereby forming a cell stack of 100 cells.

It is to be noted here that in forming the above cell stack, O-ring-like sealing members, such as shown by reference numerals 527, 537, 547 and 557 in FIG. 5, were placed on the surfaces of each pair of neighboring separator plates facing each other, so that pairs of O-ring-like sealing members faced each other. Each of these pairs of O-ring-like sealing members were so arranged that they were finally pressed to each other directly or indirectly via MEA, thereby sealing the oxidant gas, fuel gas and cooling water. Thereby, a 100 cell-stacked cell stack was produced having a pair of cooling water units provided at the two ends thereof, and also having a cooling water unit for every unit cell. The thus made unit cell was sandwiched between two current collecting plates, and further sandwiched between two rigid insulating plates, thereby forming a fuel cell test unit. This fuel cell test unit was sandwiched by a press having two opposing and planar pressing surfaces, so that the pressing surfaces contacted the respective insulating plates. By the press, a pressure, corresponding to the tightening pressure, of 6 kgf/cm² of contact area between electrode and separator plate was applied to the fuel cell test unit. Also, electric leads were attached to all the separator plates, thereby enabling measurements of cell voltages of respective unit cells at any time during the power generation test as will be described below.

The thus prepared fuel test unit was kept at 70° C., wherein a steam-reformed methane gas humidified and heated to have a dew point of 68.5° C. was supplied to the fuel electrode, and air humidified and heated to have a dew point also of 70° C. was supplied to the oxidant electrode of the fuel cell. As a result, the fuel cell test unit showed an open-circuit voltage of 97.4 V, averaging 0.97 V per unit cell, under no load.

This fuel cell test unit was then subjected to a continuous power generation test under conditions of a fuel utilization rate of 80%, an oxygen utilization rate of 40% and an electric current density of 0.3 A/cm². The initial voltage generated by the fuel cell test unit, as measured, was 72.8 V, averaging 0.728 V per unit cell.

At a time point of about 5500 hours after the start of the power generation, the cell voltages of the 5 unit cells from Cell No. 96 to Cell No. 100, each of which had an initial short-circuit conductivity greater than 1.5 mS/cm², started abruptly decreasing. About 200 hours after the start of the abrupt decrease, the average cell voltage of these five unit cells decreased to a voltage 0.4 V or lower. Then, the power generation test of the fuel cell test unit was temporarily stopped. The open-circuit voltage then was as low as 96.8 V, averaging 0.96 V per unit cell.

Thus, the 100 cell-stacked fuel cell test unit was then released from tightening, and the five unit cells from Cell No. 96 to 100 were removed. By disassembling and observing the five unit cells, it was found that all the polymer electrolyte membranes in MEAs of the five unit cells had holes generated during the power generation test.

The remaining 95 unit cells were re-assembled and re-tightened at the same pressure, corresponding to the tightening pressure, of 6 kgf/cm² of contact area, to a 95 cell-stacked fuel cell test unit. Such fuel cell test unit was again subjected to a power generation test under the same conditions as described above.

At a time point of about 18,000 hours after the first start of the power generation including the 5500 hours, the cell voltages of the 10 unit cells from Cell No. 86 to Cell No. 95, each of which had an initial short-circuit conductivity greater than 1.0 and not greater than 1.5 mS/cm², started abruptly decreasing. About 200 hours after the start of the abrupt decrease, the average cell voltage of these five unit cells decreased to a voltage 0.4 V or lower. Then, the power generation test of the fuel cell test unit was temporarily stopped. The open-circuit voltage then was as low as 91.4 V, averaging 0.962 V per unit cell.

Thus, the 95 cell-stacked fuel cell test unit was then released from tightening, and the ten unit cells from Cell No. 86 to 95 were removed. By disassembling and observing the ten unit cells, it was found that all the polymer electrolyte membranes in MEAs of the ten unit cells had holes generated during the power generation test.

The remaining 85 unit cells were re-assembled and re-tightened to a 85 cell-stacked fuel cell test unit. Such fuel cell test unit was again subjected to a power generation test under the same conditions as described above.

At a time point of about 23,000 hours after the first start of the power generation including the 18,000 hours, the cell voltages of the 15 unit cells from Cell No. 71 to Cell No. 85, each of which had an initial short-circuit conductivity greater than 0.5 and not greater than 1.0 mS/cm², started abruptly decreasing. About 200 hours after the start of the abrupt decrease, the average cell voltage of these 15 unit cells decreased to a voltage 0.4 V or lower. Then, the power generation test of the fuel cell test unit was temporarily stopped. The open-circuit voltage then was as low as 80.9 V, averaging 0.952 V per unit cell.

Thus, the 85 cell-stacked fuel cell test unit was then released from tightening, and the fifteen unit cells from Cell No. 71 to 85 were removed. By disassembling and observing the fifteen unit cells, it was found that all the polymer electrolyte membranes in MEAs of the fifteen unit cells had holes generated during the power generation test.

The remaining 70 unit cells were re-assembled and re-tightened to a 70 cell-stacked fuel cell test unit. Such fuel cell test unit was again subjected to a power generation test under the same conditions as described above.

At a time point of about 30,000 hours after the first start of the power generation including the 23,000 hours, the 70 unit cells from Cell No. 1 to Cell No. 70, each of which had an initial short-circuit conductivity not greater than 0.5 mS/cm², still had an average cell voltage not lower than 0.7 V, and had an open-circuit voltage as low as 67.9 V, averaging 0.970 V per unit cell.

As evident from the results of the test according to the present Example 7, it has been found that fuel cells having short lives for power generation operation can be predicted or estimated by measuring initial short-circuit conductivities of MEAs before fuel cell assembly. More specifically, fuel cells having power generation lives shorter than about 10,000 hours can be avoided by a method of manufacturing a fuel cell or an inspection method for a fuel cell, in which only MEAs having short-circuit conductivities of not greater than about 1.5 mS/cm² are used, i.e. in which MEAs having short-circuit conductivities of greater than about 1.5 mS/cm² (or unit cells having such MEAs or cell stacks having such unit cells) are inspected and removed before fuel cell assembly. It has also been found from the above results that by using only MEAs having short-circuit conductivities of not greater than about 0.5 mS/cm², fuel cells having longer power generation lives, such as 30,000 hours or longer, can be expected.

EXAMPLE 8

In a manner similar to Examples 1 and 2, MEAs according to the present Example were made, except that here the carbon paper used in Example 1 was replaced by a carbon non-woven fabric, and that the carbon non-woven fabrics and the carbon cloths for the gas diffusion layers were preliminarily subjected to surface smoothing treatment as will be described below.

In the case of the carbon non-woven fabric, fuzzy micro fibers of carbon on the surface of the carbon non-woven fabric were removed by flame treatment, i.e., applying a burning flame to the surface thereof, thereby smoothing the surface of the carbon non-woven fabric.

In the case of the carbon cloths, the following three kinds of treatments were respectively conducted for the surface smoothing.

According to one treatment, each carbon cloth was pressed at both surfaces thereof by a press at a pressure of 30 kgf/cm² for 5 minutes.

According to another treatment, each carbon cloth was subjected to hot pressing at a temperature of 150° C. and a pressure of 30 kgf/cm² for 5 minutes. As a reference, the influence of the variation of the hot pressing temperature on the resultant MEAs was examined in a temperature range between 120° C. and 180° C., whereby no significant difference was found in such temperature range.

According to the third treatment, each carbon cloth was first subjected to the same hot pressing as described above and thereafter flame treated as used for the carbon non-woven fabric.

Using the above-described one treatment for carbon non-woven fabric, and three treatments for carbon cloths, 25 MEAs were made for each of the four treatments, thereby making 100 MEAs in total.

In a manner similar to that employed in Example 7 described with reference to FIG. 8, each of the thus prepared MEAs was sandwiched between two current collecting plates each made of a 5 mm thick copper plate having gold plating on each surface thereof, thereby forming a sandwich assembly, which was placed to be horizontally flat, so that the weight of one current collecting plate on the MEA was the weight applied to the MEA. This sandwich assembly of the MEA with the current collecting plates was placed in a thermo-hygrostat chamber at a temperature of 25° C. and humidity of 30%. Then, a constant DC voltage of 0.2 V was applied between the current collecting plates, whereby the variation, with time, of the current value was measured. From the current value, the short-circuit conductivity of the MEA was obtained by calculation.

It was found therefrom that all 100 MEAs had short-circuit conductivities not greater than 0.5 mS/cm$^2$. Among them, inter alia, all 25 MEAs using carbon non-woven fabrics subjected to the flame treatment had short-circuit conductivities not greater than 0.2 mS/cm$^2$.

All 25 MEAs using the carbon cloths subjected to the press had short-circuit conductivities of not greater than 0.5 mS/cm$^2$. Further, all 25 MEAs using the carbon cloths subjected to hot pressing had short-circuit conductivities of not greater than 0.3 mS/cm$^2$. Lastly, all 25 MEAs using the carbon cloths subjected to hot pressing and thereafter to flame treatment had short-circuit conductivities of not greater than 0.2 mS/cm$^2$.

Next, in order to study whether water repellency treatment to be provided to the gas diffusion layers is affected by the preliminary surface smoothing treatment, two comparative experiments were conducted. That is, in one of the experiments, the surface treatment was conducted before the water repellency treatment, whereas in the other experiment, the surface treatment was conducted after the water repellency treatment. It was found therefrom that good effects by the surface smoothing treatment were obtained.

Hereinbefore, the effects according to the present invention have been described with reference to Examples. It is to be noted here that in some of the above Examples, short-circuit conductivities attributed to micro short-circuits in MEAs and hydrogen leak currents of MEAs were obtained by applying a constant DC voltage of not greater than 0.5 V, thereby measuring steady-state currents thereof, and by conversion calculation from such measured steady-state currents. However, according to separate experiments using an application of a constant DC current of not greater than 5 mA/cm$^2$ to each MEA, thereby measuring steady-state voltage, it was confirmed that similar short-circuit conductivities and hydrogen leak currents of MEAs could be obtained with good reproducibility as well.

The constant voltages and constant currents to be applied to each MEA are preferred to be as low and as small as possible, for the purpose of preventing electrode catalyst material of each MEA from being oxidized. However, if the applied voltage is too low, or the applied current is too small, the resultant steady-state current or steady-state voltage becomes too small or low. From the viewpoint of resolving powers of commercially available measuring equipment, it was confirmed that highly reproducible results could be obtained with the application of constant DC voltage of about 0.2 V or constant DC current of about 2 mA/cm$^2$. Further, it has also been confirmed that even with a greater constant DC voltage, but not greater than about 0.5 V, or a greater constant DC current, but not greater than about 5 mA/cm$^2$, which allows commercially available measuring equipment to conduct highly reproducible results, the MEAs are not affected with respect to their oxidation.

As evident from the foregoing descriptions, according to a polymer electrolyte fuel cell of the present invention, the durability of the fuel cell can be very significantly improved in a manner: that a tightening pressure of about 2 to 4 kgf/cm$^2$ of area of electrode is used; or that a tightening pressure of about 4 to 8 kgf/cm$^2$ of contact area between electrode and separator plate is used; or that the short-circuit conductivity attributed to DC resistance component between the fuel electrode and the oxidant electrode of each unit cell, namely MEA, is made not to exceed a predetermined value such as about 1.5 mS/cm$^2$; or that the hydrogen leak current per area of electrode of each MEA is made not to exceed a predetermined value such as about 3 mA/cm$^2$.

Further, by a method of manufacturing or an inspection method for a polymer electrolyte fuel cell according to the present invention, fuel cells having high durability can be efficiently manufactured in such manner as to remove such MEAs or unit cells using such MEAs or such cell stacks that have short-circuit conductivities exceeding a predetermined value such as about 1.5 mS/cm$^2$, or that have hydrogen leak current values exceeding a predetermined value such as about 3 mA/cm$^2$.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A polymer electrolyte fuel cell comprising a cell stack having a plurality of unit cells tightened in a stacking direction of the stack, each unit cell comprising: an electrolyte membrane-electrode assembly comprising a hydrogen ion conductive polymer electrolyte membrane and first and second electrodes respectively placed on opposite major surfaces of the electrolyte membrane, each of the electrodes comprising a gas diffusion layer and a catalyst layer; the gas diffusion layer comprising a non-woven fabric, a first electrically conductive separator plate contacting the first electrode and having a first gas flow channel for supplying and exhausting a fuel gas to and from the first electrode; and a second electrically conductive separator plate contacting the second electrode and having a second gas flow channel for supplying and exhausting an oxidant gas to and from the second electrode, at least two laterally spaced-apart sealing members, each sealing member encircling a periphery of one of at least two laterally spaced-apart manifold holes in at least one of the separator plates, and end plates and tightening members being disposed so as to sandwich the cell stack for applying a tightening pressure to each of the first and second electrodes, wherein each of the sealing members is configured to be placed in contact with a surface of each first electrically conductive separator plate and each second electrically conductive separator plate, wherein the electrolyte membrane-electrode assembly has a short-circuit conductivity of not greater than 1.5 mS/cm$^2$, which is measured by applying a constant DC voltage to the electrolyte membrane-electrode assembly to obtain a steady-state current or by applying a constant DC current thereto to obtain a steady-state voltage and converting the steady-state current or the steady-state voltage, by calculation, to the short-circuit conductivity of not greater than about 1.5 mS/cm$^2$, wherein a tightening pressure applied to each of the first and second electrodes is about 4.0 to 8.0 kgf/cm$^2$ of a contact area of each of the first and second electrodes with its respective electrically conductive separator plate, wherein the tightening pressure is obtained by subtracting an elastic recovery force of the sealing members of the separator plates from a total tightening load of the cell stack to obtain a tightening load to the electrode, and dividing the tightening load by the contact area, wherein at least one of the first gas flow channel and the second gas flow channel has a form of a groove having lateral groove walls, and wherein a groove wall of at least one of the first gas flow channel and the second gas flow channel is tapered so that a top of the groove is wider than a bottom of the groove.

2. The polymer electrolyte fuel cell according to claim 1, wherein each of the first and second gas flow channels comprises a groove having a width of about 0.8 mm to 1 mm and a depth of about 0.3 to 1 mm.

3. The polymer electrolyte fuel cell according to claim 1, wherein the contact area of each of the first and second electrodes with its respective electrically conductive separator is equal to or greater, than an area of each of the first and second electrodes which is out of contact with its respective electrically conductive separator plate.

4. The polymer electrolyte fuel cell according to claim 1, wherein the tightening members are provided at each of four corners at an outer surface of each of said end plates.

5. The polymer electrolyte fuel cell according to claim 1, wherein each of said tightening members includes a tightening rod, a bolt, and a coil spring or a belleville spring.

6. The polymer electrolyte fuel cell according to claim 1, wherein said each unit cell comprises the first electrically conductive separator plate contacting the first electrode and having the gas flow channel for supplying and exhausting a fuel gas to and from the first electrode, and manifold holes; and the second electrically conductive separator plate contacting the second electrode and having the gas flow channel for supplying and exhausting the oxidant gas to and from the second electrode, and manifold holes, wherein each of the sealing members is an O-ring-like sealing member and wherein the O-ring-like sealing members are configured to be placed in contact with an outer surface of each first electrically conductive separator plate and each second electrically conductive separator plate in a manner to encircle the manifold holes and an entire perimeter of the gas flow channel of each electrically conductive separator plate.

7. The polymer electrolyte fuel cell according to claim 1, wherein the short-circuit conductivity is 1 $mS/cm^2$ or less.

8. The polymer electrolyte fuel cell according to claim 1, wherein the short-circuit conductivity is 0.2 $mS/cm^2$ to 0.8 $mS/cm^2$.

9. A polymer electrolyte fuel cell comprising a cell stack having a plurality of unit cells tightened in a stacking direction of the stack, each unit cell comprising: an electrolyte membrane-electrode assembly comprising a hydrogen ion conductive polymer electrolyte membrane and first and second electrodes respectively placed on opposite major surfaces of the electrolyte membrane, each of the electrodes comprising a gas diffusion layer and a catalyst layer; the gas diffusion layer comprising a non-woven fabric, a first electrically conductive separator plate contacting the first electrode and having a first gas flow channel for supplying and exhausting a fuel gas to and from the first electrode; and a second electrically conductive separator plate contacting the second electrode and having a second gas flow channel for supplying and exhausting an oxidant gas to and from the second electrode, a sealing member, and end plates and tightening members being disposed so as to sandwich the cell stack for applying a tightening pressure to each of the first and second electrodes, wherein the sealing member is configured to be placed in contact with a surface of each first electrically conductive separator plate and each second electrically conductive separator plate, wherein at least one of the first gas flow channel and the second gas flow channel has a form of a groove having lateral groove walls, and wherein a groove wall of at least one of the first gas flow channel and the second gas flow channel is tapered so that a top of the groove is wider than a bottom of the groove, wherein the electrolyte membrane-electrode assembly has a short-circuit conductivity of not greater than 1.5 $mS/cm^2$, which is measured by applying a constant DC voltage to the electrolyte membrane-electrode assembly to obtain a steady-state current or by applying a constant DC current thereto to obtain a steady-state voltage and converting the steady-state current or the steady-state voltage, by calculation, to the short-circuit conductivity of not greater than about 1.5 $mS/cm^2$, and wherein a tightening pressure applied to each of the first and second electrodes is about 4.0 to 8.0 $kgf/cm^2$ of a contact area of each of the first and second electrodes with its respective electrically conductive separator plate, wherein the tightening pressure is obtained by subtracting an elastic recovery force of the sealing member of the separator plates from a total tightening load of the cell stack to obtain a tightening load to the electrode, and dividing the tightening load by the contact area.

10. The polymer electrolyte fuel cell according to claim 9, wherein each of the first and second gas flow channels comprises a groove having a width of about 0.8 mm to 1 mm and a depth of about 0.3 to 1 mm.

11. The polymer electrolyte fuel cell according to claim 9, wherein the contact area of each of the first and second electrodes with its respective electrically conductive separator is equal to or greater than an area of each of the first and second electrodes which is out of contact with its respective electrically conductive separator plate.

12. The polymer electrolyte fuel cell according to claim 9, wherein the tightening members are provided at each of four corners at an outer surface of each of said end plates.

13. The polymer electrolyte fuel cell according to claim 9, wherein each of said tightening members includes a tightening rod, a bolt, and a coil spring or a belleville spring.

14. The polymer electrolyte fuel cell according to claim 9, wherein said each unit cell comprises the first electrically conductive separator plate contacting the first electrode and having the gas flow channel for supplying and exhausting a fuel gas to and from the first electrode, and manifold holes; and the second electrically conductive separator plate contacting the second electrode and having the gas flow channel for supplying and exhausting the oxidant gas to and from the second electrode, and manifold holes, wherein said sealing member is an O-ring-like sealing member and wherein the O-ring-like sealing member is configured to be placed in contact with an outer surface of each first electrically conductive separator plate and each second electrically conductive separator plate in a manner to encircle the manifold holes and an entire perimeter of the gas flow channel of each electrically conductive separator plate.

15. The polymer electrolyte fuel cell according to claim 9, wherein the short-circuit conductivity is 1 $mS/cm^2$ or less.

16. The polymer electrolyte fuel cell according to claim 9, wherein the short-circuit conductivity is 0.2 $mS/cm^2$ to 0.8 $mS/cm^2$.

* * * * *